US012652164B2

(12) United States Patent  
Wright et al.

(10) Patent No.: US 12,652,164 B2  
(45) Date of Patent: Jun. 9, 2026

(54) METHODS AND SYSTEMS FOR EFFICIENT TRANSFER OF ENTITIES ON A PEER-TO-PEER DISTRIBUTED LEDGER USING THE BLOCKCHAIN

(71) Applicant: nChain Licensing AG, Zug (CH)

(72) Inventors: Craig Steven Wright, London (GB); Stephane Savanah, London (GB)

(73) Assignee: NCHAIN LICENSING AG, Zug (CH)

( * ) Notice: Subject to any disclaimer, the term of this patent is extended or adjusted under 35 U.S.C. 154(b) by 117 days.

(21) Appl. No.: 18/777,459

(22) Filed: Jul. 18, 2024

(65) Prior Publication Data

US 2025/0088351 A1 Mar. 13, 2025

Related U.S. Application Data

(63) Continuation of application No. 16/079,094, filed as application No. PCT/IB2017/050866 on Feb. 16, 2017, now Pat. No. 12,107,952.

(30) Foreign Application Priority Data

| Feb. 23, 2016 | (GB) | ...................................... | 1603123 |
| Feb. 23, 2016 | (GB) | ...................................... | 1603125 |
| Mar. 16, 2016 | (GB) | ...................................... | 1604493 |

(51) Int. Cl.  
*G06F 16/27* (2019.01)  
*G06F 16/13* (2019.01)  
(Continued)

(52) U.S. Cl.  
CPC .......... *H04L 9/0838* (2013.01); *G06F 16/137* (2019.01); *G06Q 20/065* (2013.01); (Continued)

(58) Field of Classification Search  
CPC ... H04L 9/0838; H04L 9/0637; H04L 9/0819; H04L 9/0894; H04L 9/321; H04L 9/3213; (Continued)

(56) References Cited

U.S. PATENT DOCUMENTS

| 5,535,276 | A | 7/1996 | Ganesan |
| 5,600,725 | A | 2/1997 | Rueppel et al. |

(Continued)

FOREIGN PATENT DOCUMENTS

| AU | 2016100059 A4 | 3/2016 |
| CA | 2867765 A1 | 4/2016 |

(Continued)

OTHER PUBLICATIONS

J. Blomer. A Survey on Distributed File System Technology. J. of Physics: Conference Series, v.608, 012039 (Year: 2015).*

(Continued)

*Primary Examiner* — Lynn D Feild  
*Assistant Examiner* — Vladimir I Gavrilenko  
(74) *Attorney, Agent, or Firm* — Tarolli, Sundheim, Covell & Tummino LLP

(57) ABSTRACT

The invention provides a secure method for exchanging entities via a blockchain. The invention incorporates tokenisation techniques, and also techniques for embedding metadata in a redeem script of a blockchain transaction. Embodiment(s) provide a computer implemented method of performing a transfer, the method comprising: generating a first exchange transaction, and broadcasting, over a first network, the first exchange transaction for inclusion on a P2P distributed ledger, wherein the first exchange transaction comprises: an indication of a first quantity of a cryptocurrency to be transferred; a first input provided from an output of a first invitation transaction from a first user, the first invitation transaction previously included on the P2P (Continued)

distributed ledger, a first script, a first user private key associated with the first user, a first third-party private key associated with a first third-party, and a first output indicating a transfer of a first entity from the first user to a second user; and wherein the first script comprises: a first set of metadata providing an indication of the first entity to be transferred and a first set of conditions for the transfer, a first user public key associated with the first user, the first user public key being a cryptographic pair with the first user private key, and a first third-party public key associated with the first third-party, the first third-party public key being a cryptographic pair with the first third-party private key.

12 Claims, 13 Drawing Sheets

(51) Int. Cl.

| | |
|---|---|
| *G06Q 20/06* | (2012.01) |
| *G06Q 20/22* | (2012.01) |
| *G06Q 20/40* | (2012.01) |
| *H04L 9/06* | (2006.01) |
| *H04L 9/08* | (2006.01) |
| *H04L 9/32* | (2006.01) |
| *H04L 9/00* | (2022.01) |

(52) U.S. Cl.
CPC ....... *G06Q 20/223* (2013.01); *G06Q 20/4015* (2020.05); *H04L 9/0637* (2013.01); *H04L 9/0819* (2013.01); *H04L 9/0894* (2013.01); *H04L 9/321* (2013.01); *H04L 9/3213* (2013.01); *H04L 9/3247* (2013.01); *G06F 16/27* (2019.01); *H04L 9/50* (2022.05); *H04L 2209/56* (2013.01)

(58) Field of Classification Search
CPC ..... H04L 9/3247; H04L 9/50; H04L 2209/56; G06F 16/137; G06F 16/27; G06Q 20/4015; G06Q 20/065; G06Q 20/223
See application file for complete search history.

(56) References Cited

U.S. PATENT DOCUMENTS

| | | | |
|---|---|---|---|
| 5,761,305 A | 6/1998 | Vanstone et al. |
| 5,867,578 A | 2/1999 | Brickell et al. |
| 5,889,865 A | 3/1999 | Vanstone et al. |
| 5,896,455 A | 4/1999 | Vanstone et al. |
| 5,920,630 A | 7/1999 | Wertheimer et al. |
| 5,933,504 A | 8/1999 | Vanstone et al. |
| 6,061,449 A | 5/2000 | Candelore et al. |
| 6,078,667 A | 6/2000 | Johnson |
| 6,118,874 A | 9/2000 | Okamoto et al. |
| 6,122,736 A | 9/2000 | Vanstone et al. |
| 6,141,420 A | 10/2000 | Vanstone et al. |
| 6,286,098 B1 | 9/2001 | Wenig et al. |
| 6,487,660 B1 | 11/2002 | Vanstone et al. |
| 6,490,352 B1 | 12/2002 | Schroeppel |
| 6,618,483 B1 | 9/2003 | Vanstone et al. |
| 6,662,299 B1 | 12/2003 | Price, III |
| 6,704,870 B2 | 3/2004 | Vanstone et al. |
| 6,785,813 B1 | 8/2004 | Vanstone et al. |
| 6,792,530 B1 | 9/2004 | Qu et al. |
| 6,819,766 B1 | 11/2004 | Weidong |
| 6,876,745 B1 | 4/2005 | Kurumatani |
| 7,003,665 B1 | 2/2006 | Dultz et al. |
| 7,006,633 B1 | 2/2006 | Reece |
| 7,095,851 B1 | 8/2006 | Scheidt |
| 7,181,017 B1 | 2/2007 | Nagel et al. |
| 7,912,747 B2 | 3/2011 | Sachedina |
| 7,929,702 B2 | 4/2011 | Brown et al. |
| 7,970,135 B1 | 6/2011 | Schwenk |

| | | | |
|---|---|---|---|
| 8,166,481 B2 | 4/2012 | Dadiomov et al. |
| 8,401,185 B1 | 3/2013 | Telang |
| 8,520,855 B1 | 8/2013 | Kohno et al. |
| 8,522,011 B2 | 8/2013 | Spalka et al. |
| 8,855,318 B1 | 10/2014 | Patnala et al. |
| 9,209,980 B2 | 12/2015 | Bowman et al. |
| 9,251,531 B2 | 2/2016 | Sarkissian |
| 9,258,130 B2 | 2/2016 | Hwang et al. |
| 9,298,806 B1 | 3/2016 | Vessenes et al. |
| 9,350,549 B2 | 5/2016 | Lumb |
| 9,436,923 B1 | 9/2016 | Sriram et al. |
| 9,641,338 B2 | 5/2017 | Sriram et al. |
| 9,673,975 B1 | 6/2017 | Machani |
| 9,961,030 B2 | 5/2018 | Murphy et al. |
| 10,050,779 B2 | 8/2018 | Alness et al. |
| 10,068,228 B1 | 9/2018 | Winklevoss et al. |
| 10,354,325 B1 | 7/2019 | Skala et al. |
| 10,510,053 B2 | 12/2019 | Armstrong |
| 10,516,527 B1 | 12/2019 | Machani et al. |
| 10,659,223 B2 | 5/2020 | Wright et al. |
| 10,719,816 B1 * | 7/2020 | Kurani ................. H04W 48/12 |
| 11,115,196 B1 | 9/2021 | Triandopoulos et al. |
| 11,188,907 B1 | 11/2021 | Vijayvergia et al. |
| 11,210,663 B2 | 12/2021 | Voorhees |
| 11,270,274 B1 * | 3/2022 | Kurani ................... G06Q 30/06 |
| 11,372,455 B2 | 6/2022 | Gauthier, Jr. |
| 11,455,378 B2 | 9/2022 | Wright et al. |
| 11,663,609 B2 | 5/2023 | Christidis et al. |
| 11,727,501 B2 | 8/2023 | Wright |
| 2001/0002486 A1 | 5/2001 | Kocher et al. |
| 2001/0050990 A1 | 12/2001 | Sudia |
| 2002/0112171 A1 | 8/2002 | Ginter et al. |
| 2002/0198791 A1 | 12/2002 | Perkowski |
| 2003/0026432 A1 | 2/2003 | Woodward |
| 2003/0046202 A1 | 3/2003 | Knapp |
| 2003/0048906 A1 | 3/2003 | Vora et al. |
| 2003/0081785 A1 | 5/2003 | Boneh et al. |
| 2003/0188153 A1 | 10/2003 | Demoff et al. |
| 2004/0030932 A1 | 2/2004 | Juels et al. |
| 2004/0049687 A1 | 3/2004 | Orsini et al. |
| 2004/0078775 A1 | 4/2004 | Chow et al. |
| 2004/0111484 A1 | 6/2004 | Young et al. |
| 2004/0190181 A1 | 9/2004 | Hikosaka et al. |
| 2004/0193890 A1 | 9/2004 | Girault |
| 2004/0252831 A1 | 12/2004 | Uehara |
| 2005/0071283 A1 | 3/2005 | Randle et al. |
| 2005/0094806 A1 | 5/2005 | Jao et al. |
| 2005/0138374 A1 | 6/2005 | Zheng et al. |
| 2006/0023887 A1 | 2/2006 | Agrawal et al. |
| 2006/0034494 A1 | 2/2006 | Holloran |
| 2006/0153365 A1 | 7/2006 | Beeson |
| 2006/0153366 A1 | 7/2006 | Beeson |
| 2006/0153367 A1 | 7/2006 | Beeson |
| 2006/0153368 A1 | 7/2006 | Beeson |
| 2006/0153370 A1 | 7/2006 | Beeson |
| 2006/0156012 A1 | 7/2006 | Beeson |
| 2006/0156013 A1 | 7/2006 | Beeson |
| 2006/0161485 A1 | 7/2006 | Meldahl |
| 2006/0173788 A1 | 8/2006 | Nath Pandya et al. |
| 2006/0179319 A1 | 8/2006 | Krawczyk |
| 2006/0242038 A1 | 10/2006 | Giudilli |
| 2006/0248114 A1 | 11/2006 | Anderson et al. |
| 2007/0055880 A1 | 3/2007 | Lauter et al. |
| 2007/0165843 A1 | 7/2007 | Lauter et al. |
| 2007/0192842 A1 | 8/2007 | Beaulieu et al. |
| 2007/0223706 A1 | 9/2007 | Gantman et al. |
| 2007/0265978 A1 | 11/2007 | Kahn et al. |
| 2007/0269040 A1 | 11/2007 | Yuval et al. |
| 2007/0276836 A1 | 11/2007 | Chatterjee et al. |
| 2007/0288320 A1 | 12/2007 | Cooper et al. |
| 2008/0048022 A1 | 2/2008 | Vawter |
| 2008/0082817 A1 | 4/2008 | Takahashi et al. |
| 2008/0101596 A1 | 5/2008 | Cerruti et al. |
| 2008/0130895 A1 | 6/2008 | Jueneman et al. |
| 2008/0137857 A1 | 6/2008 | Bellare et al. |
| 2008/0144836 A1 | 6/2008 | Sanders et al. |
| 2008/0165955 A1 | 7/2008 | Ibrahim |
| 2008/0195499 A1 | 8/2008 | Meredith et al. |
| 2008/0260143 A1 | 10/2008 | Ibrahim |

(56)          References Cited

U.S. PATENT DOCUMENTS

| | | |
|---|---|---|
| 2008/0263357 A1 | 10/2008 | Boyen |
| 2008/0285759 A1 | 11/2008 | Shaw |
| 2008/0288773 A1 | 11/2008 | Nguyen et al. |
| 2009/0022311 A1 | 1/2009 | Vanstone et al. |
| 2009/0048979 A1 | 2/2009 | Al-Herz et al. |
| 2009/0074179 A1 | 3/2009 | Futa et al. |
| 2009/0161876 A1 | 6/2009 | Sherkin |
| 2009/0282243 A1 | 11/2009 | Rose et al. |
| 2010/0005302 A1 | 1/2010 | Vishnu et al. |
| 2010/0023771 A1 | 1/2010 | Struik |
| 2010/0031369 A1 | 2/2010 | Grummt |
| 2010/0037055 A1 | 2/2010 | Fazio et al. |
| 2010/0042839 A1 | 2/2010 | Ho |
| 2010/0054458 A1 | 3/2010 | Schneider |
| 2010/0054480 A1 | 3/2010 | Schneider |
| 2010/0131752 A1 | 5/2010 | Flegel |
| 2010/0131755 A1 | 5/2010 | Zhu et al. |
| 2010/0134848 A1 | 6/2010 | Lynggaard et al. |
| 2010/0146292 A1 | 6/2010 | Shi et al. |
| 2010/0150341 A1 | 6/2010 | Dodgson et al. |
| 2010/0172501 A1 | 7/2010 | Tian et al. |
| 2010/0199095 A1 | 8/2010 | Ho |
| 2010/0217986 A1 | 8/2010 | Schneider |
| 2010/0228973 A1 | 9/2010 | Dancer et al. |
| 2010/0241848 A1 | 9/2010 | Smith et al. |
| 2010/0268778 A1 | 10/2010 | Kim et al. |
| 2011/0016510 A1 | 1/2011 | Matsuda et al. |
| 2011/0022854 A1 | 1/2011 | Macchetti et al. |
| 2011/0058672 A1 | 3/2011 | Sannino et al. |
| 2011/0202773 A1 | 8/2011 | Ghouti et al. |
| 2011/0208790 A1 | 8/2011 | Brown et al. |
| 2011/0208970 A1 | 8/2011 | Brown et al. |
| 2011/0246766 A1 | 10/2011 | Orsini et al. |
| 2011/0307698 A1 | 12/2011 | Vanstone |
| 2011/0311051 A1 | 12/2011 | Resch et al. |
| 2012/0011362 A1 | 1/2012 | Lambert |
| 2012/0039474 A1 | 2/2012 | Ho |
| 2012/0090026 A1 | 4/2012 | Andrews et al. |
| 2012/0100833 A1 | 4/2012 | Gao |
| 2012/0198228 A1 | 8/2012 | Oberheide et al. |
| 2012/0214441 A1 | 8/2012 | Raleigh |
| 2012/0233674 A1 | 9/2012 | Gladstone et al. |
| 2012/0243687 A1 | 9/2012 | Li et al. |
| 2012/0284794 A1 | 11/2012 | Trent et al. |
| 2012/0290830 A1 | 11/2012 | Resch et al. |
| 2012/0331287 A1 | 12/2012 | Bowman et al. |
| 2013/0030941 A1 | 1/2013 | Meredith et al. |
| 2013/0034642 A1 | 2/2013 | Eckstrom |
| 2013/0051552 A1 | 2/2013 | Handschuh et al. |
| 2013/0061049 A1 | 3/2013 | Irvine |
| 2013/0077783 A1 | 3/2013 | Anshel et al. |
| 2013/0103945 A1 | 4/2013 | Cannon et al. |
| 2013/0159413 A1 | 6/2013 | Davis et al. |
| 2013/0177157 A1 | 7/2013 | Li et al. |
| 2013/0191632 A1 | 7/2013 | Spector et al. |
| 2013/0198104 A1 | 8/2013 | Parker |
| 2013/0287210 A1 | 10/2013 | Matsuda et al. |
| 2013/0304642 A1 | 11/2013 | Campos |
| 2013/0305057 A1 | 11/2013 | Greco et al. |
| 2013/0305333 A1 | 11/2013 | Katzer et al. |
| 2013/0318578 A1 | 11/2013 | Palagummi |
| 2013/0318588 A1 | 11/2013 | Metzger |
| 2014/0012751 A1 | 1/2014 | Kuhn et al. |
| 2014/0046792 A1 | 2/2014 | Ganesan |
| 2014/0068246 A1 | 3/2014 | Hartley et al. |
| 2014/0082358 A1 | 3/2014 | Nakhjiri et al. |
| 2014/0108473 A1 | 4/2014 | Nowoczynski et al. |
| 2014/0129441 A1 | 5/2014 | Blanco et al. |
| 2014/0129844 A1 | 5/2014 | Johnson et al. |
| 2014/0132620 A1 | 5/2014 | Kim |
| 2014/0188719 A1 | 7/2014 | Poornachandran et al. |
| 2014/0195425 A1 | 7/2014 | Campos et al. |
| 2014/0223580 A1 | 8/2014 | Neivanov et al. |
| 2014/0250006 A1 | 9/2014 | Makhotin et al. |
| 2014/0270401 A1 | 9/2014 | Irwin et al. |
| 2014/0330923 A1 | 11/2014 | Baptist et al. |
| 2015/0006386 A1 | 1/2015 | Tebbe |
| 2015/0024764 A1 | 1/2015 | Dochow et al. |
| 2015/0039470 A1 | 2/2015 | Crites |
| 2015/0052369 A1 | 2/2015 | Koning et al. |
| 2015/0066748 A1 | 3/2015 | Winslow et al. |
| 2015/0086020 A1 | 3/2015 | Harjula et al. |
| 2015/0089616 A1 | 3/2015 | Brezinski et al. |
| 2015/0095648 A1 | 4/2015 | Nix |
| 2015/0120567 A1 | 4/2015 | Van Rooyen et al. |
| 2015/0120569 A1 | 4/2015 | Belshe et al. |
| 2015/0124961 A1 | 5/2015 | Lambert et al. |
| 2015/0154562 A1 | 6/2015 | Emmerson |
| 2015/0170112 A1 | 6/2015 | DeCastro |
| 2015/0188698 A1 | 7/2015 | Tsai |
| 2015/0188700 A1 | 7/2015 | Ben Saied et al. |
| 2015/0205929 A1 | 7/2015 | Brama |
| 2015/0206106 A1 | 7/2015 | Yago |
| 2015/0213433 A1 | 7/2015 | Khan |
| 2015/0215336 A1 | 7/2015 | Navaraj et al. |
| 2015/0244690 A1 | 8/2015 | Mossbarger |
| 2015/0254463 A1 | 9/2015 | Ryhorchuk et al. |
| 2015/0254639 A1 | 9/2015 | Radu |
| 2015/0256347 A1 | 9/2015 | Tseng et al. |
| 2015/0262139 A1 | 9/2015 | Shtylman |
| 2015/0262140 A1 | 9/2015 | Armstrong |
| 2015/0269570 A1 | 9/2015 | Phan et al. |
| 2015/0278780 A1 | 10/2015 | Vaidyanathan et al. |
| 2015/0294425 A1 | 10/2015 | Benson |
| 2015/0296570 A1 | 10/2015 | Altamura et al. |
| 2015/0302401 A1 | 10/2015 | Metral |
| 2015/0304302 A1 | 10/2015 | Zhang |
| 2015/0310497 A1 | 10/2015 | Valin et al. |
| 2015/0324764 A1 | 11/2015 | Van Rooyen et al. |
| 2015/0324789 A1 | 11/2015 | Dvorak et al. |
| 2015/0332224 A1 | 11/2015 | Melika et al. |
| 2015/0332395 A1 | 11/2015 | Walker et al. |
| 2015/0348017 A1 | 12/2015 | Allmen |
| 2015/0349958 A1 | 12/2015 | Lindell |
| 2015/0350171 A1 | 12/2015 | Brumley |
| 2015/0356523 A1 | 12/2015 | Madden |
| 2015/0363768 A1 | 12/2015 | Melika et al. |
| 2015/0363770 A1 | 12/2015 | Ronca et al. |
| 2015/0363773 A1 | 12/2015 | Ronca et al. |
| 2015/0363777 A1 | 12/2015 | Ronca et al. |
| 2015/0371224 A1 | 12/2015 | Lingappa |
| 2015/0379510 A1 | 12/2015 | Smith |
| 2015/0381729 A1 | 12/2015 | Manohar et al. |
| 2016/0012465 A1 | 1/2016 | Sharp |
| 2016/0026918 A1 | 1/2016 | Barbieri et al. |
| 2016/0027229 A1 | 1/2016 | Spanos et al. |
| 2016/0028552 A1 | 1/2016 | Spanos et al. |
| 2016/0055511 A1 | 2/2016 | Chidella et al. |
| 2016/0055583 A1 | 2/2016 | Liberty et al. |
| 2016/0065370 A1 | 3/2016 | Le Saint et al. |
| 2016/0071108 A1 | 3/2016 | Caldera et al. |
| 2016/0072800 A1* | 3/2016 | Soon-Shiong ........ H04L 9/0872 726/7 |
| 2016/0085955 A1 | 3/2016 | Lerner |
| 2016/0086175 A1 | 3/2016 | Finlow-Bates et al. |
| 2016/0092870 A1 | 3/2016 | Salama et al. |
| 2016/0092988 A1 | 3/2016 | Letourneau |
| 2016/0098723 A1 | 4/2016 | Feeney |
| 2016/0132684 A1 | 5/2016 | Barbas et al. |
| 2016/0140335 A1 | 5/2016 | Proulx et al. |
| 2016/0149878 A1 | 5/2016 | Pogorelik et al. |
| 2016/0162897 A1 | 6/2016 | Feeney |
| 2016/0203522 A1 | 7/2016 | Shiffert et al. |
| 2016/0203572 A1 | 7/2016 | Mcconaghy et al. |
| 2016/0210617 A1 | 7/2016 | Leger |
| 2016/0234026 A1 | 8/2016 | Wilkins et al. |
| 2016/0260171 A1 | 9/2016 | Ford et al. |
| 2016/0261408 A1 | 9/2016 | Peddada et al. |
| 2016/0261565 A1 | 9/2016 | Lorenz et al. |
| 2016/0261690 A1 | 9/2016 | Ford |
| 2016/0269182 A1 | 9/2016 | Sriram et al. |
| 2016/0275294 A1 | 9/2016 | Irvine |
| 2016/0275492 A1 | 9/2016 | Brickell et al. |
| 2016/0283941 A1 | 9/2016 | Andrade |

(56)  References Cited

U.S. PATENT DOCUMENTS

| | | |
|---|---|---|
| 2016/0292672 A1 | 10/2016 | Fay et al. |
| 2016/0294562 A1 | 10/2016 | Oberheide et al. |
| 2016/0321434 A1 | 11/2016 | McCoy et al. |
| 2016/0335533 A1 | 11/2016 | Davis et al. |
| 2016/0335924 A1 | 11/2016 | Ikarashi et al. |
| 2016/0337119 A1 | 11/2016 | Hosaka et al. |
| 2016/0337124 A1 | 11/2016 | Rozman |
| 2016/0342977 A1 | 11/2016 | Lam |
| 2016/0342984 A1 | 11/2016 | Thomas et al. |
| 2016/0342994 A1 | 11/2016 | Davis |
| 2016/0344543 A1 | 11/2016 | Alness et al. |
| 2016/0350749 A1 | 12/2016 | Wilkins et al. |
| 2016/0352518 A1 | 12/2016 | Ford et al. |
| 2016/0379208 A1 | 12/2016 | Deliwala et al. |
| 2016/0381010 A1 | 12/2016 | Bhandari et al. |
| 2017/0005804 A1 | 1/2017 | Zinder |
| 2017/0011394 A1 | 1/2017 | Kumar et al. |
| 2017/0012948 A1 | 1/2017 | Peeters et al. |
| 2017/0017936 A1 | 1/2017 | Bisikalo et al. |
| 2017/0024817 A1 | 1/2017 | Wager et al. |
| 2017/0046664 A1 | 2/2017 | Haldenby et al. |
| 2017/0046668 A1 | 2/2017 | Rowley et al. |
| 2017/0046693 A1 | 2/2017 | Haldenby et al. |
| 2017/0046698 A1 | 2/2017 | Haldenby et al. |
| 2017/0046792 A1 | 2/2017 | Haldenby et al. |
| 2017/0046806 A1 | 2/2017 | Haldenby et al. |
| 2017/0061138 A1 | 3/2017 | Lambert |
| 2017/0061833 A1 | 3/2017 | Joye et al. |
| 2017/0075877 A1 | 3/2017 | Lepeltier |
| 2017/0083907 A1 | 3/2017 | McDonough et al. |
| 2017/0083910 A1 | 3/2017 | Kraemer et al. |
| 2017/0091148 A1 | 3/2017 | Takahashi |
| 2017/0091750 A1 | 3/2017 | Maim |
| 2017/0091764 A1 | 3/2017 | Lloyd et al. |
| 2017/0103385 A1 | 4/2017 | Wilson, Jr. et al. |
| 2017/0109540 A1 | 4/2017 | Heiman et al. |
| 2017/0116608 A1 | 4/2017 | Forzley et al. |
| 2017/0124348 A1 | 5/2017 | Pourzandi et al. |
| 2017/0132620 A1 | 5/2017 | Miller et al. |
| 2017/0132621 A1 | 5/2017 | Miller et al. |
| 2017/0148016 A1 | 5/2017 | Davis |
| 2017/0154331 A1 | 6/2017 | Voorhees |
| 2017/0154391 A1 | 6/2017 | Watkins et al. |
| 2017/0169403 A1 | 6/2017 | Zhang |
| 2017/0178237 A1 | 6/2017 | Wong |
| 2017/0178263 A1 | 6/2017 | Kraemer et al. |
| 2017/0185527 A1 | 6/2017 | Ueda |
| 2017/0187535 A1 | 6/2017 | Middleton et al. |
| 2017/0200137 A1* | 7/2017 | Vilmont ............. G06Q 30/0213 |
| 2017/0228547 A1 | 8/2017 | Smith et al. |
| 2017/0243193 A1 | 8/2017 | Manian et al. |
| 2017/0243214 A1 | 8/2017 | Johnsrud et al. |
| 2017/0250801 A1 | 8/2017 | Chen et al. |
| 2017/0300877 A1 | 10/2017 | Mann et al. |
| 2017/0308580 A1 | 10/2017 | Naganuma et al. |
| 2017/0316390 A1 | 11/2017 | Smith et al. |
| 2017/0324663 A1 | 11/2017 | Menase |
| 2017/0324715 A1 | 11/2017 | Frincu et al. |
| 2018/0025670 A1 | 1/2018 | Ikarashi et al. |
| 2018/0034810 A1 | 2/2018 | Pe'Er et al. |
| 2018/0109377 A1 | 4/2018 | Fu |
| 2018/0123780 A1 | 5/2018 | Ikarashi |
| 2018/0131512 A1 | 5/2018 | Gajek |
| 2018/0146367 A1 | 5/2018 | Altin et al. |
| 2018/0176017 A1 | 6/2018 | Rodriguez et al. |
| 2018/0176222 A1 | 6/2018 | Bhaskar et al. |
| 2018/0191502 A1* | 7/2018 | Karame .................. H04L 63/12 |
| 2018/0225431 A1 | 8/2018 | Ikarashi et al. |
| 2018/0240107 A1 | 8/2018 | Andrade |
| 2018/0247191 A1 | 8/2018 | Katz et al. |
| 2018/0276663 A1 | 9/2018 | Arora |
| 2018/0285840 A1 | 10/2018 | Hasan |
| 2018/0341648 A1 | 11/2018 | Kakavand et al. |
| 2018/0349572 A1 | 12/2018 | Chen et al. |
| 2018/0367298 A1 | 12/2018 | Wright et al. |
| 2018/0376318 A1 | 12/2018 | Wang et al. |
| 2019/0014094 A1 | 1/2019 | Le Saint |
| 2019/0034936 A1 | 1/2019 | Nolan et al. |
| 2019/0080321 A1 | 3/2019 | Mundis et al. |
| 2019/0080404 A1 | 3/2019 | Molinari et al. |
| 2019/0080406 A1 | 3/2019 | Molinari et al. |
| 2019/0130368 A1 | 5/2019 | Li et al. |
| 2019/0149337 A1 | 5/2019 | Savanah et al. |
| 2019/0158470 A1 | 5/2019 | Wright et al. |
| 2019/0188793 A1 | 6/2019 | Molinari et al. |
| 2019/0199531 A1 | 6/2019 | Staples et al. |
| 2019/0220859 A1 | 7/2019 | Weight et al. |
| 2019/0229911 A1 | 7/2019 | Allen |
| 2019/0238334 A1 | 8/2019 | Nakamura |
| 2019/0244186 A1 | 8/2019 | Guo et al. |
| 2019/0266132 A1 | 8/2019 | Rubenstein |
| 2019/0305863 A1 | 10/2019 | Fayyad |
| 2019/0340352 A1 | 11/2019 | Peeters et al. |
| 2019/0349733 A1 | 11/2019 | Nolan et al. |
| 2019/0378139 A1 | 12/2019 | Stribady et al. |
| 2019/0392118 A1 | 12/2019 | Elden et al. |
| 2019/0392536 A1 | 12/2019 | Rice |
| 2020/0026785 A1 | 1/2020 | Patangia et al. |
| 2020/0250176 A1 | 8/2020 | Padmanabhan |
| 2020/0285935 A1 | 9/2020 | Song et al. |
| 2021/0056070 A1 | 2/2021 | Kakavand et al. |
| 2021/0194677 A1 | 6/2021 | Pourzandi et al. |
| 2021/0304198 A1 | 9/2021 | Lingappa |
| 2021/0409489 A1 | 12/2021 | Speasl et al. |

FOREIGN PATENT DOCUMENTS

| | | |
|---|---|---|
| CN | 1262007 A | 8/2000 |
| CN | 101447980 A | 6/2009 |
| CN | 101477669 A | 7/2009 |
| CN | 102144371 A | 8/2011 |
| CN | 102938036 A | 2/2013 |
| CN | 103440209 A | 12/2013 |
| CN | 103795529 A | 5/2014 |
| CN | 103927656 A | 7/2014 |
| CN | 104320262 A | 1/2015 |
| CN | 104331516 A | 2/2015 |
| CN | 104392354 A | 3/2015 |
| CN | 104463001 A | 3/2015 |
| CN | 104620535 A | 5/2015 |
| CN | 104704504 A | 6/2015 |
| CN | 105204802 A | 12/2015 |
| CN | 105306194 A | 2/2016 |
| CN | 105323064 A | 2/2016 |
| CN | 106022917 A | 10/2016 |
| CN | 106411503 A | 2/2017 |
| DE | 102010002241 B4 | 3/2012 |
| EP | 1477882 A2 | 11/2004 |
| EP | 2237473 A1 | 10/2010 |
| EP | 2538606 A1 | 12/2012 |
| EP | 2975570 A1 | 1/2016 |
| EP | 3010176 A1 | 4/2016 |
| FR | 3018370 A1 | 9/2015 |
| FR | 3018377 A1 | 9/2015 |
| FR | 3018378 A1 | 9/2015 |
| FR | 3018379 A1 | 9/2015 |
| JP | H11239124 A | 8/1999 |
| JP | H11289324 A | 10/1999 |
| JP | 2000502553 A | 2/2000 |
| JP | 2001069566 A | 3/2001 |
| JP | 2001195479 A | 7/2001 |
| JP | 2002026895 A | 1/2002 |
| JP | 2004192587 A | 7/2004 |
| JP | 2004246882 A | 9/2004 |
| JP | 2004341152 A | 12/2004 |
| JP | 2006293764 A | 10/2006 |
| JP | 2007036910 A | 2/2007 |
| JP | 2007067631 A | 3/2007 |
| JP | 2007242221 A | 9/2007 |
| JP | 2008136063 A | 6/2008 |
| JP | 2008146601 A | 6/2008 |
| JP | 2009105824 A | 5/2009 |
| JP | 2009171292 A | 7/2009 |
| JP | 2009526411 A | 7/2009 |

(56)　　　　　References Cited

FOREIGN PATENT DOCUMENTS

| JP | 2010503320 A | 1/2010 |
| JP | 2010219912 A | 9/2010 |
| JP | 2011082662 A | 4/2011 |
| JP | 2011211461 A | 10/2011 |
| JP | 2012515393 A | 7/2012 |
| JP | 2014068140 A | 4/2014 |
| JP | 2014153583 A | 8/2014 |
| JP | 2015536617 A | 12/2015 |
| JP | 5858506 B1 | 2/2016 |
| JP | 5858507 B1 | 2/2016 |
| JP | 2019512909 A | 5/2019 |
| KR | 20110012085 A | 2/2011 |
| KR | 101544722 B1 | 8/2015 |
| KR | 101579232 B1 | 1/2016 |
| KR | 20160009716 A | 1/2016 |
| RU | 2015108134 A | 10/2016 |
| RU | 2015109271 A | 10/2016 |
| TW | 201202975 A | 1/2012 |
| WO | 2005096542 A1 | 10/2005 |
| WO | 2005107141 A1 | 11/2005 |
| WO | 2007113040 A1 | 10/2007 |
| WO | 2012039474 A1 | 3/2012 |
| WO | 2012054785 A1 | 4/2012 |
| WO | 2013034278 A2 | 3/2013 |
| WO | 2013053058 A1 | 4/2013 |
| WO | 2015127789 A1 | 9/2015 |
| WO | 2015142765 A1 | 9/2015 |
| WO | 2015171580 A1 | 11/2015 |
| WO | 2015175854 A2 | 11/2015 |
| WO | 2015188151 A1 | 12/2015 |
| WO | 2015194798 A1 | 12/2015 |
| WO | 2016022864 A2 | 2/2016 |
| WO | 2016137360 A2 | 9/2016 |
| WO | 2016137499 A1 | 9/2016 |
| WO | 2016161073 A1 | 10/2016 |
| WO | 2017006134 A1 | 1/2017 |
| WO | 2017112664 A1 | 6/2017 |

OTHER PUBLICATIONS

B. Halshofer, W. Klas, A Survey on Techniques for Achieving Metadata Interoperability. Uni. Viena, CSUR (Year: 2010).*

Reddit, "Could Microsoft use the blockchain as a license key for it's software?," r/Bitcoin, Sep. 7, 2015 [retrieved May 8, 2020], https://www.reddit.com/r/Bitcoin/comments/3jz09c/could_microsoft_use_the_blockchain_as_a_license/?st=iw26pndq&sh=b862bf7d, 2 pages.

Reiner et al., "Bitcoin Wallet Identity Verification Specification," diyhpluswiki, http://diyhpl.us/-bryan/papers2/bitcoin/armory-verisign-bitcoin-wallet-identityspecification.pdf, Feb. 27, 2015 (retrieved Jan. 27, 2016), 24 pages.

Rockwell, "BitCongress—Process For Blockchain Voting & Law," retrieved from http://generalbitcoin.com/BitCongress_Whitepaper.pdf, Feb. 12, 2016, 8 pages.

Ryepdx et al., "Answer to 'What is the Global Registrar?'," Ethereum Stack Exchange, Feb. 26, 2016 [retrieved Jan. 30, 2017], http://ethereum.stackexchange.com/questions/1610/what-is-the-global-registrar, 3 pages.

Sams, "Ethereum: Turing-complete, programmable money," Cryptonomics, Feb. 1, 2014, https://cryptonomics.org/2014/02/01/ethereum-turing-complete-programmable-money, 4 pages.

Sanchez, "Marketplaces," GitHub, Jun. 10, 2015 [retrieved May 12, 2020], https://github.com/drwasho/openbazaar-documentation/blob/master/04%20Marketplaces.md, 37 pages.

Sanchez, "Protocol," Github, https://github.com/drwasho/openbazaar-documentation/blob/master/03%20Protocol.md, Jun. 15, 2015, 53 pages.

Sanchez, "Ricardian Contracts in OpenBazaar," Github, https://gist.github.com/drwasho/a5380544c170bdbbbad8, Jan. 2016, 12 pages.

Sardesai, "Coinffeine: A P2P Alternative to Centralised Bitcoin Exchanges," Cryptocoins News, Mar. 2, 2014 [retrieved Feb. 14, 2017], https://www.cryptocoinsnews.com/coinffeine-p2p-alternative-centralised-bitcoin-exchanges/, 5 pages.

Satoshi et al., "Connection Limits," Bitcoin Forum, Aug. 9, 2010, https://bitcointalk.org/index.php?topic=741.0;prev_next=prev, 2 pages.

Scott, "Counterparty to Create First Peer-to-Peer Digital Asset Exchange Platform," Cointelegraph, https://cointelegraph.com/news/counterparty_to_create_first_peer_to_peer_digital_asset_exchange_platform, Apr. 10, 2014 [retrieved Dec. 12, 2018], 2 pages.

Sevareid et al., "Use Case Asset Depository," Github.com, Jan. 11, 2016 version (last edited May 5, 2016) [retrieved Jan. 30, 2017], https://github.com/hyperledger/hyperledger/wiki/Use-Case-Asset-Depository, 4 pages.

Snow et al., "Factom: Business Processes Secured by Immutable Audit Trails on the Blockchain Version 1.2," factom.com, Apr. 25, 2018, 38 pages.

Stampery, "Features: Blockchain-based data certification at your fingertips," Stampery.com, https://stampery.com/features/, archived Mar. 5, 2016 [retrieved Nov. 3, 2016], 4 pages.

Subramanian, et al., "The State of Cryptocurrencies, Their Issues and Policy Interactions", International Information Management Association, vol. 24, No. 24, Numnber 3, 2015, pp. 25-40.

Sullivan et al., "Peer-to-peer Affine Commitment using Bitcoin," Carnegie Mellon University, Jun. 17, 2015, 54 pages.

Swan, "Blockchain: Blueprint for a New Economy," O'Reilly, Feb. 2015, 149 pages.

Swanson, "Great Chain of Numbers: Chapter 3: Next Generation Platforms," Great Wall of Numbers, Mar. 4, 2014 [retrieved Jan. 30, 2017], http://www.ofnumbers.com/2014/03/04/chapter-3-next-generation-platforms/, 25 pages.

Swanson, Tim, "Watermarked Tokens and Pseudonymity on Public Blockchains", Nov. 4, 2015, 78 pages.

Taiwanese Office Action mailed Apr. 12, 2021, Patent Application No. 109142412, 5 pages.

Taiwanese Office Action mailed Jul. 28, 2020, Patent Application No. 106105709, 9 pages.

Taiwanese Office Action mailed Oct. 7, 2020, Patent Application No. 106105713, 4 pages.

Tasca et al., "Digital Currencies: Principles, Trends, Opportunities, and Risks," ECUREX Research Working Paper, Sep. 7, 2015 (Oct. 2015 version), 110 pages.

The Institute of Electrical and Electronics Engineers, Inc., "IEEE P1363, D1-pre Draft Standard for Public Key Cryptography", Prepared by the 1363 Working Gorup of the C/MSC Committee, Jun. 2009, 362 pages.

Third-Party Submission Under 37 CFR 1.290 mailed Jun. 12, 2019, U.S. Appl. No. 16/078,605, filed Aug. 21, 2018, 31 pages.

Third-Party Submission Under 37 CFR 1.290 mailed Jun. 12, 2019, U.S. Appl. No. 16/079,089, filed Aug. 22, 2018, 19 pages.

Timeisnow77724 et al., "Help understanding counterparty, thanks in advance!," Reddit r/counterparty_xcp, https://www.reddit.com/r/counterparty_xcp/comments/2qntze/help_understanding_counterparty_thanks_in_advance/, Dec. 28, 2014 [retrieved Dec. 11, 2018], 4 pages.

Toomim, "P2pool as prior art for nChain's Turing Complete Transactions patent—or, how to patent all blockchain apps without anybody noticing," Medium, Sep. 3, 2018, https://medium.com/@j_73307/p2pool-as-prior-art-for-nchains-turing-complete-transactions-patent-or-how-to-patent-all-40f3d429eaa4, 13 pages.

Tuesta et al., "Smart contracts: the ultimate automation of trust?," BBVA Research Financial Inclusion Unit, Oct. 2015, 5 pages.

UK Commercial Search Report mailed Apr. 25, 2016, Patent Application No. 11603117.1, filed Feb. 23, 2016, 11 pages.

UK Commercial Search Report mailed Feb. 17, 2017, Patent Application No. 1604493.5, 8 pages.

UK Commercial Search Report mailed Jan. 13, 2017, Patent Application No. 1604498.4, 8 pages.

UK Commercial Search Report mailed Jan. 18, 2017, Patent Application No. GB510135, filed Mar. 16, 2016, 5 pages.

UK Commercial Search Report mailed Jun. 12, 2017, Patent Application No. GB510912, 6 pages.

UK Commercial Search Report mailed Jun. 14, 2016, Patent Application No. 1607249.8, 4 pages.

(56) References Cited

OTHER PUBLICATIONS

UK Commercial Search Report mailed Jun. 27, 2016, Patent Application No. GB1603123.9, filed Feb. 23, 2016, 11 pages.
UK Commercial Search Report mailed Jun. 27, 2016, Patent Application No. GB1603125.4, filed Feb. 23, 2016, 11 pages.
UK Commercial Search Report mailed Jun. 28, 2016, Patent Application No. GB1603122.1, filed Feb. 23, 2016, 12 pages.
UK Commercial Search Report mailed Jun. 6, 2016, Patent Application No. 1604497.6, filed Mar. 16, 2016, 6 pages.
UK Commercial Search Report mailed Jun. 9, 2016, Patent Application No. GB1603114.8 , 4 pages.
UK Commercial Search Report mailed Jun. 9, 2016, Patent Application No. GB1603117.1, filed Feb. 23, 2016, 12 pages.
UK Commercial Search Report mailed May 16, 2016, Patent Application No. GB1603125.4, 8 pages.
UK Commercial Search Report mailed May 20, 2016, Patent Application No. 1605026.2, 4 pages.
UK Commercial Search Report mailed May 24, 2016, Patent Application No. GB1605571.7, filed Apr. 1, 2016, 3 pages.
UK Commercial Search Report mailed May 9, 2016, Patent Application No. GB1603112.2, 6 pages.
UK Commercial Search Report mailed May 9, 2016, Patent Application No. GB1603114.8, filed Feb. 23, 2016, 2 pages.
UK Commercial Search Report mailed Nov. 14, 2016, Patent Application No. GB1607063.3, 8 pages.
UK Commercial Search Report mailed Nov. 30, 2016, Patent Application No. 1607058.3, filed Apr. 22, 2016, 7 pages.
UK Commercial Search Report mailed Oct. 10, 2016, Patent Application No. GB1607484.1, filed Apr. 29, 2016, 5 pages.
UK Commercial Search Report mailed Sep. 30, 2016, Patent Application No. 1606630.0, filed Apr. 15, 2016, 7 pages.
Buterin, "Ethereum White Paper", A Next Generation Smart Contract & Decentralized Application Platform, 2014, 36 pages.
UK Expanded Commercial Search Report mailed Jun. 15, 2016, Patent Application No. 1605026.2, 5 pages.
UK IPO Search Report mailed Dec. 12, 2016, Patent Application No. GB1606630.0, filed Apr. 15, 2016, 4 pages.
UK IPO Search Report mailed Dec. 15, 2016, Patent Application No. GB1607063.3, 6 pages.
UK IPO Search Report mailed Dec. 21, 2016, Patent Application No. GB1607058.3, 3 pages.
UK IPO Search Report mailed Dec. 21, 2016, Patent Application No. GB1607058.3, filed Apr. 22, 2016, 3 pages.
UK IPO Search Report mailed Dec. 21, 2016, Patent Application No. GB1607484.1, 4 pages.
UK IPO Search Report mailed Dec. 23, 2016, Patent Application No. GB1604495.0, 5 pages.
UK IPO Search Report mailed Dec. 28, 2016, Patent Application No. GB1604497.6, filed Mar. 16, 2016, 4 pages.
UK IPO Search Report mailed Dec. 5, 2016, Patent Application No. 1607249.8, 4 pages.
UK IPO Search Report mailed Dec. 6, 2016, Patent Application No. 1604493.5, 6 pages.
UK IPO Search Report mailed Dec. 6, 2016, Patent Application No. 1607482.5, 5 pages.
UK IPO Search Report mailed Jan. 25, 2017, Patent Application No. 1605026.2, 3 pages.
UK IPO Search Report mailed Jan. 3, 2017, Patent Application No. 1604498.4, 4 pages.
UK IPO Search Report mailed Jul. 26, 2016, Patent Application No. GB1603114.8, filed Feb. 23, 2016, 5 pages.
UK IPO Search Report mailed Jul. 4, 2016, Patent Application No. GB1603125.4, filed Feb. 23, 2016, 6 pages.
UK IPO Search Report mailed Jul. 5, 2016, Patent Application No. GB1603123.9, filed Feb. 23, 2016, 5 pages.
UK IPO Search Report mailed Oct. 17, 2016, Patent Application No. GB1603117.1, filed Feb. 23, 2016, 5 pages.
UK IPO Search Report mailed Oct. 21, 2016, Patent Application No. GB1603112.2, 4 pages.

UK IPO Search Report mailed Oct. 26, 2016, Patent Application No. GB1603122.1, filed Feb. 23, 2016, 4 pages.
UK IPO Search Report mailed Oct. 9, 2017, Patent Application No. GB1707788.4, 6 pages.
UK IPO Search Report mailed Sep. 9, 2016, Patent Application No. GB1605571.7, filed Apr. 1, 2016, 5 pages.
Vayngrib, "DHT hardening," GitHub, https://github.com/tradle/about/wiki/DHT-hardening, Feb. 2, 2015 (last updated May 21, 2015) [retrieved Dec. 13, 2018], 5 pages.
Vayngrib, "Future, operating business on chain," Github.com, May 4, 2015 [retrieved Jan. 30, 2017], https://github.com/tradle/about/wiki/Future,-operating-business-on-chain, 9 pages.
Vietnamese Office Action mailed Sep. 27, 2018, Patent Application No. 1-2018-03358, filed Feb. 16, 2017, 2 pages.
Walport et al., "Distributed Ledger Technology: beyond block chain—A report by the UK Government Chief Scientific Adviser," United Kingdom Government Office for Science, Dec. 2015, 88 pages.
Watanabe et al., "Blockchain contract: A complete consensus using blockchain," IEEE 4th Global Conference on Consumer Electronics, Oct. 27, 2015, 3 pages.
Weller et al., "CounterpartyXCP/Documentation: Protocol Specification," Github.com, Jan. 25, 2015 (last edited Jun. 17, 2019) [retrieved Jan. 13, 2020], https://github.com/CounterpartyXCP/Documentation/blob/master/Developers/protocol_specification.md, 10 pages.
White, "How Computers Work," Que Publishing 7th Edition, Oct. 15, 2003, 44 pages.
Whitequark, "#bitcoin-wizards on Jul. 30, 2015—irc logs at whitequark.org," whitequark.org, https://irclog.whitequark.org/bitcoin-wizards/2015-07-30, Jul. 30, 2015 [retrieved Dec. 12, 2018], 8 pages.
Wikipedia, "Public-key Cryptography", Zosterops (talk contribs), Jul. 5, 2015, Retrieved from https://en.wikipedia.org/w/index.php?title=Public-key_cryptography$oldid=670016308, 14 pages.
Wikipedia, "Shamir's Secret Sharing," Wikipedia the Free Encyclopedia, Jan. 20, 2017 version [retrieved on Jan. 9, 2019], https://en.wikipedia.org/w/index.php?title=Shamir's_Secret_Sharing&oldid=761082071, 6 pages.
Wikipedia, "Shamir's Secret Sharing," Wikipedia the Free Encyclopedia, Mar. 6, 2016 version [retrieved on Jun. 24, 2019], https://en.wikipedia.org/w/index.php?title=Shamir's_Secret_Sharing&oldid=708636892, 6 pages.
Willet et al., "Omni Protocol Specification (formerly Mastercoin)," Github, Nov. 5, 2013 [retrieved May 12, 2020], https://github.com/OmniLayer/spec/blob/9978cc3984ae0b6e51216c4ae74042fc4097b993/README.md, 69 pages.
Willoms et al., "Using blockchain to save and verify software licensing," Bitcoin Forum, https://bitcointalk.org/index.php?topic=671435.0, Jun. 30, 2014 [retrieved Dec. 13, 2018], 3 pages.
Wood, "Ethereum: A Secure Decentralised Generalised Transaction Ledger: Final Draft—Under Review," Etereum Project Yellow Paper, http://tech.lab.carl.pro/kb/ethereum/yellowpaper, Apr. 2014, 32 pages.
Wright, "Registry and Automated Management Method for Blockchain Enforced Smart Contracts," U.S. Appl. No. 15/138,717, filed Apr. 26, 2016.
Wuille, "Hierarchical Deterministic Wallets," Github, https://github.com/bitcoin/bips/blob/ab90b5289f0356282397fa9b8aa47d2238a7b380/bip-0032.mediawiki, Feb. 12, 2016 (retrieved Mar. 23, 2017), 9 pages.
Yaokai et al., "Experimental evaluation of the next-generation cryptocurrency platform Ethereum," CSS2015 Computer Security Symposium 2015 Proceedings 2015(3):1151-1158, Oct. 14, 2015.
Zhang et al., "AntShare Trading Platform," Github.com, Jun. 3, 2016 (last edited Aug. 21, 2016) [retrieved Jan. 30, 2017], https://github.com/AntShares/AntShares/wiki/Whitepaper-1.1, 9 pages.
Zindros, Dionysis, "A Pseudonymous Trust System for a Decentralized Anonymous Marketplace", web-of-trust.md, https://gist.github.com/dionyziz/e3b296861175e0ebea4b, Jul. 2, 2014, 30 pages.
Zyskind et al., "Decentralizing Privacy: Using a Blockchain to Protect Personal Data," 2015 IEEE CS Security and Privacy Workshops, May 21, 2015, 5 pages.

(56) References Cited

OTHER PUBLICATIONS

Zyskind et al., "Enigma: Decentralized Computation Platform with Guaranteed Privacy," arXiv preprint arXiv:1506, Jun. 10, 2015, 14 pages.

Vroblefski et al., "Managing User Relationships in Hierarchies for Information System Security", Science Direct, Decision Support System 43, 2007, 12 pages.

Wikipedia, "Diffie-Hellman Key Exchange," retrieved from https://en.wikipedia.org/w/index.php?title=Diffie%E2%80% 93Hellman_key_exchange&oldid=759611604, Jan. 2017, 10 pages.

Nikkei Business Publications, Inc., "Blockchain & Bitcoin", 2016, 4 pages.

Bitcoin Wiki, "Contract," Bitcoin Wiki, https://en.bitcoin.it/w/index.php?title=Contract&oldid=59172, May 22, 2011 (updated dated Oct. 22, 2015) [retrieved Jan. 8, 2024], 2 pages.

Fromknecht Conner, et al., "A Decentralized Public Key Infrastructure with Identity Retention" Nov. 11, 2024, 16 pages.

Drwasho, "Openbazaar Documentation", Github, Jun. 2015, 53 pages.

Durback, "Standard BIP Draft: Turing Pseudo-Completeness," Bitcoin-Dev, Dec. 10, 2015, https://bitcoin-development.narkive.com/uRciVtAQ/standard-bip-draft-turing-pseudo-completeness, 11 pages.

Eragmus et al., "Time to lobby Bitcoin's core devs: "SF Bitcoin Devs Seminar—Scalability to billions of transactions per day, satoshi-level Micropayments, near-zero risk of custodial theft, & Instant transactions" . . . but only w/ a malleability-fixing soft fork," Reddit r/bitcoin, https://www.reddit.com/r/Bitcoin/comments/2z2191/time_to_lobby_bitcoins_core_devs_sf_bitcoin_devs/, Mar. 14, 2015 [Dec. 12, 2018], 21 pages.

Ethereum, "EIP-20: Token Standard," retrieved from https://eips.ethereum.org/EIPS/eip-20, Nov. 19, 2015, 5 pages.

European Communication pursuant to Article 94(3) EPC mailed Jan. 2, 2020, Patent Application No. 18166910.2-1218, filed Feb. 16, 2017, 4 pages.

European Communication pursuant to Article 94(3) EPC mailed Jul. 1, 2019, Application No. 17707121.4-1218, filed Feb. 14, 2017, 6 pages.

Extended European Search Report mailed Jul. 18, 2018, Patent Application No. 18166910.2-1218, filed Feb. 16, 2017, 8 pages.

Familiar et al., "Transcript for #bitcoin-dev 2015/03/27," BitcoinStats, http://bitcoinstats.com/irc/bitcoin-dev/logs/2015/03/27, Mar. 27, 2015 [archived version Jun. 27, 2016], 11 pages.

Feng et al., "A Next Generation Cryptocurrency Platform Ethereum and Its Evaluation", Oct. 14, 2015, 12 pages.

Fimkrypto, "FIMK 0.6.4 Released," Github.com, Feb. 11, 2016 [retrieved Jan. 30, 2017], https://github.com/fimkrypto/fimk/releases, 17 pages.

Flood et al., "Contract as Automaton: The Computational Representation of Financial Agreements," Office of Financial Research Working Paper No. 15-04, Mar. 26, 2015, 25 pages.

Fotiou et al., "Decentralized Name-based Security for Content Distribution using Blockchains," retrieved from, Mobile Multimedia Laboratory, Department of Informatics, Apr. 14, 2016, 6 pages.

Franco, "Understanding Bitcoin: Cryptography, Engineering and Economics," Wiley, ISBN: 978-1-119-01916-9, Oct. 2014, 144 pages.

Friedenbach et al., "Freimarkets: extending bitcoin protocol with user-specified bearer instruments, peer-to-peer exchange, off-chain accounting, auctions, derivatives and transitive transactions," Version v0.01, http://freico.in/docs/freimarkets-v0.0.1.pdf, Aug. 24, 2013 [retrieved Dec. 12, 2018], 25 pages.

Friedenbach, "[Bitcoin-development] New Output Script Type," Linux Foundation, Sep. 14, 2013, https://lists.linuxfoundation.org/pipermail/bitcoin-dev/2013-September/003256.html, 2 pages.

Fuchita, "Special Topic: Innovation and Finance, Blockchain and Financial Transaction Innovation," Nomura Capital Market Quarterly 19-2(74):11-35, Nov. 1, 2015.

Fujimura et al., "BRIGHT: A Concept for a Decentralized Rights Management System Based on Blockchain," 2015 IEEE 5th International Conference on Consumer Electronics—Berlin (ICCE—Berlin), Sep. 6, 2015, 2 pages.

Gautham, "Bitwage Makes Bitcoin Payroll Easier with New Features," NewsBTC, Mar. 9, 2016 (retrieved Jun. 16, 2020), https://www.newsbtc.com/2016/03/09/bitwage-makes-bitcoin-payroll-easier-new-features/, 4 pages.

Gauthierdickey, et al. "Secure Peer-to-Peer Trading in Small and Large Scale Multiplayer Games", Multimedia Systems, Apr. 29, 2014, 13 pages.

Gennaro et al., "Threshold-Optimal DSA/ECDSA Signatures and an Application to Bitcoin Wallet Security," International Conference on Applied Cryptography and Network Security, Jun. 9, 2016, 42 pages.

Gitbook, "Ethereum Frontier Guide," Gitbook (Legacy), Feb. 4, 2016, 293 pages.

Github, "Bitcoin/Bips," retrieved from http://web.archive.org/web/20150307191218/https://github.com/bitcoin/bips/blob/master/bip-0016.mediawiki, Apr. 5, 2014, 4 pages.

github.com, "Dual Key Stealth Address", About Shadow, https://github.com/shadowproject/Shadow-Docs/blob/88501b5ba019780ef9a62d26678932c54a434e08/source/index.md, Mar. 10, 2016, 27 pages.

Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.

Goldfeder et al., "Securing Bitcoin Wallets via a New DSA/ECDSA threshold signature scheme," manuscript, https://www.cs.princeton.edu/~stevenag/threshold_sigs.pdf, 2015 [retrieved Jun. 21, 2018], 26 pages.

Goldfeder et al., "Securing Bitcoin wallets via threshold signatures" Princeton's Center for Information Technology Policy, Mar. 28, 2014, 11 pages.

Goldfeder et al., "Threshold signatures and Bitcoin wallet security: A menu of options," Freedom to Tinker, May 23, 2014 [retrieved Nov. 16, 2020], https://freedom-to-tinker.com/2014/05/23/threshold-signatures-and-bitcoin-wallet-security-a-menu-of-options/, 3 pages.

Greenspan, Dr. Gideon, "MultiChain Private Blcokchain", White Paper, Jun. 2015, 17 pages.

Gutoski et al., "Hierarchical deterministic Bitcoin wallets that tolerate key leakage (Short paper)," Financial Cryptography and Data Security: 19th International Conference, FC 2015, Revised Selected Papers, Jan. 26, 2015, 9 pages.

Gutoski et al., "Hierarchical Deterministic Bitcoin Wallets That Tolerate Key Leakage", Lecture Notes in Computer Science book series (LNSC, vol. 8975), Jan. 1, 2015, 9 pages.

Hacker News, "Cryptocontracts Will Turn Contract Law into a Programming Language," retrieved from https://news.ycombinator.com/item?id=7287155, Feb. 23, 2014, 12 pages.

Hao, "On Robust Key Agreement Based on Public Key Authentication," International Conference on Financial Cryptography and Data Security, Jan. 25, 2010, 12 pages.

Harayama et al., "Key escrow method of personal decryptographic key by using elliptic curve calculation," Institute of Electronics, Information and Communication Engineers (IEICE) Technical Report 109(85):91-96, Jun. 11, 2009.

Hearn, "Distributed markets," Bitcoin Wiki, https://en.bitcoin.it/wiki/Distributed_markets, Jul. 11, 2015 [retrieved Sep. 20, 2016], 5 pages.

Herbert et al., "A Novel Method for Decentralised Peer-to-Peer Software License Validation Using Cryptocurrency Blockchain Technology," Proceedings of the 38th Australasian Computer Science Conference, Jan. 27, 2015, 9 pages.

International Search Report and Written Opinion mailed Apr. 10, 2017, Patent Application No. PCT/IB2017/050861, 11 pages.

International Search Report and Written Opinion mailed Apr. 12, 2017, Patent Application No. PCT/IB2017/050818, 10 pages.

International Search Report and Written Opinion mailed Apr. 12, 2017, Patent Application No. PCT/IB2017/050829, 9 pages.

International Search Report and Written Opinion mailed Apr. 12, 2017, Patent Application No. PCT/IB2017/050866, 10 pages.

(56)            References Cited

OTHER PUBLICATIONS

International Search Report and Written Opinion mailed Apr. 21, 2017, Patent Application No. PCT/IB2017/050820, 12 pages.
International Search Report and Written Opinion mailed Apr. 26, 2017, International Patent Application No. PCT/IB2017/050865, filed Feb. 16, 2017, 9 pages.
International Search Report and Written Opinion mailed Apr. 3, 2017, Patent Application No. PCT/IB2017/050824, filed Feb. 14, 2017, 13 pages.
International Search Report and Written Opinion mailed Apr. 3, 2017, Patent Application No. PCT/IB2017/050827, 10 pages.
International Search Report and Written Opinion mailed Apr. 3, 2017, Patent Application No. PCT/IB2017/050827, 13 pages.
International Search Report and Written Opinion mailed Aug. 3, 2018, Patent Application No. PCT/IB2018/053289, 10 pages.
International Search Report and Written Opinion mailed Mar. 29, 2017, Patent Application No. PCT/IB2017/050821, 10 pages.
International Search Report and Written Opinion mailed Mar. 29, 2017, Patent Application No. PCT/IB2017/050821, 13 pages.
International Search Report and Written Opinion mailed Mar. 30, 2017, Patent Application No. PCT/IB2017/050819, 13 pages.
International Search Report and Written Opinion mailed Mar. 30, 2017, Patent Application No. PCT/IB2017/050825, 9 pages.
International Search Report and Written Opinion mailed May 29, 2017, International Patent Application No. PCT/IB2017/050815, filed Feb. 14, 2017, 10 pages.
International Search Report and Written Opinion mailed May 31, 2017, Patent Application No. PCT/IB2017/050856, filed Feb. 16, 2017, 11 pages.
International Search Report and Written Opinion mailed May 31, 2017, Patent Application No. PCT/IB2017/050867, 11 pages.
International Search Report and Written Opinion mailed May 31, 2017, Patent Application No. PCT/IB2017/050979, filed Feb. 21, 2017, 11 pages.
International Search Report and Written Opinion mailed May 31, 2017, Patent Application No. PCT/IB2017/050980, 12 pages.
Japanese Notice of Reason(s) for Rejection mailed Mar. 30, 2021, Patent Application No. 2018-539890, 8 pages.
Japanese Notice of Reason(s) for Rejection mailed Mar. 30, 2021, Patent Application No. 2018-539893, 6 pages.
Japanese Office Action mailed Feb. 16, 2021, Patent Application No. 2018-539331, 7 pages.
Japanese Office Action mailed Jan. 22, 2019, Patent Application No. 2018-516682, filed Feb. 16, 2017, 14 pages.
Japanese Office Action mailed Oct. 6, 2020, Patent Application No. 2018-539865, 14 pages.
Japanese Office Action mailed Oct. 8, 2019, Patent Application No. 2018-539895, 9 pages.
Jesionek et al., "BIP0032: Hierarchical Deterministic Wallets," GitHub, https://github.com/bitcoin/bips/blob/master/bip-0032.mediawiki, Jan. 2014, 9 pages.
Jl2012 et al., "MinAddress : Now remember your addresses easily," BitCoinTalk, Sep. 16, 2014 (retrieved Jun. 16, 2020), https://bitcointalk.org/index.php?topic=774741.150;wap2, 3 pages.
Ken K., "Tutorial 1: Your first contract," Ethereum.org, Dec. 2014, https://web.archive.org/save/_embed/https://forum.ethereum.org/discussion/1634/tutorial-1-your-first-contract/p1, 22 pages.
Kens et al., "Cryptocontracts Will Turn Contract Law Into a Programming Language ," Hacker News, Feb. 23, 2014, https://news.ycombinator.com/item?id=7287155, 12 pages.
Killerstorm et al., "Transcript for #bitcoin-dev Sep. 3, 2012," BitcoinStats, http://www.bitcoinstats.com/irc/bitcoin-dev/logs/2012/09/03, Sep. 3, 2012 [retrieved Dec. 21, 2018], 14 pages.
Koblitz et al., "Cryptocash, Cryptocurrencies, and Cryptocontracts," Designs, Codes and Cryptography 78 (1):87-102, publication available online Oct. 1, 2015, print publication Jan. 2016.
Kosba et al., "Hawk: The Blockchain Model of Cryptography and Privacy-Preserving Smart Contracts," IEEE Symposium on Security and Privacy, May 22, 2016, 31 pages.

Kravchenko, "Distributed multi-ledger model for financial industry," Github.com, Oct. 21, 2015 [retrieved Jan. 30, 2017], https://github.com/WebOfTrustInfo/rebooting-the-web-of-trust/blob/master/topics-andadvance-readings/DistributedMulti-ledgerModelForFinancialIndustry.md, 2 pages.
Krawczyk, "HMQV: A High-Performance Secure Diffie-Hellman Protocol," Annual International Cryptology Conference 2005, Aug. 14, 2005, first disclosed online Jul. 5, 2005, 66 pages.
Krellenstein, "The Counterparty Protocol," GitHub, https://github.com/jsimnz/Counterparty/blob/master/README.md, Jan. 8, 2014 [Dec. 12, 2018], 4 pages.
Lazarovich, Amir, "Invisible Ink: Blockchain for Data Privacy", May 8, 2015, 85 pages.
Lebeau, "An Ethereum Journey to Decentralize All Things," retrieved from https://medium.com/@SingularDTV/an-ethereum-journey-to-decentralize-all-things-8d62b02e232b#.r6n9w8kqh, Jul. 11, 2016, 10 pages.
Luu et al., "Demystifying Incentives in the Consensus Computer," ISBN, Oct. 2015, 14 pages.
Mainelli, "Blockchain: why smart contracts need shrewder people," Banking Technology, Apr. 4, 2016 [retrieved Jan. 30, 2017], http://www.bankingtech.com/461572/blockchain-why-smart-contracts-need-shrewderpeople/, 3 pages.
Manabu Takata et al., "Nikkei BP Mook, FinTech Revolution, Financial Common Sense Dissolved by Technology", Nikkei Business Publications, Inc., Jan. 27, 2016, ISBN: 978-4-8222-7188-6, pp. 44-47.
Maxwell et al., "Deterministic wallets," Bitcoin Forum, https://bitcointalk.org/index.php?topic=19137.0;all, Jun. 18, 2011 [retrieved Dec. 10, 2018], 104 pages.
Mccorry et al., "Authenticated Key Exchange over Bitcoin," International Conference on Research in Security Standardisation 2015, Dec. 15, 2015, 18 pages.
Menezes et al., "Handbook of Applied Cryptography," CRC Press, Oct. 16, 1996, 811 pages.
Menezes et al., "Handbook of Applied Cryptography: pp. 33, 38," CRC Press, Oct. 16, 1996, 3 pages.
Mezzomix et al., "Angebot: BTC (2-aus-3) Multisig Escrow (Treuhandabwicklung)," Bitcoin Forum, Feb. 9, 2014, https://bitcointalk.org/index.php?topic=456563.0, 7 pages.
Michalko et al., "Decent Whitepaper," retrieved from http://forklog.net/decent-finalizes-its-decentralized-content-distribution-platform/, Nov. 2015, 20 pages.
Michalko, "Decent Finalizes its Decentralized Content Distribution Platform," retrieved from http://forklog.net/decent-finalizes-its-decentralized-content-distribution-platform/, Dec. 14, 2016, 2 pages.
Mike et al., "Contract," Bitcoin Wiki, Oct. 22, 2015 version (first disclosed May 22, 2011) [retrieved May 12, 2020], https://en.bitcoin.it/w/index.php?title=Contract&oldid=59172, 11 pages.
Minsky et al., "Computation: Finite and Infinite Machines Chapter 14: Very Simple Bases for Computability," Prentice Hall, Inc, 1967, 29 pages.
Mirzadeh et al., "CPFP: An Efficient Key Management Scheme for Large Scale Personal Networks", IEEE, 2008, 6 pages.
Mrbandrews, "Bitcoin Core 0.11 (ch 2): Data Storage," Bitcoin Wiki, Jan. 13, 2016 (last revision Jan. 21, 2016) [retrieved May 8, 2020], https://en.bitcoin.it/w/index.php?title=Bitcoin_Core_0.11_(ch_2):_Data_storage&oldid=60024, 10 pages.
Mülli, "A Decentralized Bitcoin Exchange with Bitsquare—Attack Scenarios and Countermeasures," University of Zurich Department of Informatics Communication Systems Group Master Thesis, Jul. 30, 2015, 61 pages.
Nakamoto, "Bitcoin: A Peer-to-Peer Electronic Cash System," Bitcoin, Oct. 31, 2008, https://bitcoin.org/bitcoin.pdf, 9 pages.
Noizat et al., "Blockchain Electronic Vote," retrieved from https://www.weusecoins.com/assets/pdf/library/blockchain-electronic-vote.pdf, Apr. 29, 2015, 9 pages.
Noizat, "Handbook of Digital Currency Chapter 22: Blockchain Electronic Vote," Elsevier Inc., David Lee Kuo Chuen (ed.), May 2015, 9 pages.
NXT, "Voting," nxt.org, website archived on Feb. 18, 2016 [retrieved May 31, 2022], https://web.archive.org/web/20160218021746/https://nxt.org/what-is-nxt/voting/, 3 pages.

(56) References Cited

OTHER PUBLICATIONS

Omnilayer, Omni Protocol Specification (formerly Mastercoin), retrieved from https://github.com/OmniLayer/spec/blob/9978cc3984ae0b6e51216c4ae74042fc4097b993/README.md on Apr. 19, 2024, 58 pages.

Openchain, "Home Page," openchain.org, Dec. 22, 2015 [retrieved May 8, 2020], https://web.archive.org/web/20151222083734/https://www.openchain.org/, 18 pages.

OpenSSL Wiki, "Elliptic Curve Diffie Hellman," OpenSSL, https://wiki.openssl.org/index.php/Elliptic_Curve_Diffie_Hellman, Mar. 10, 2014 [retrieved Dec. 10, 2018], 5 pages.

OpenSSL Wiki, "EVP Key Agreement," OpenSSL, https://wiki.openssl.org/index.php/EVP_Key_Agreement, Apr. 28, 2017 [retrieved Dec. 10, 2018], 2 pages.

Perry, "Tapeke: Bitcoin Accounting for Non-Accountants," http://codinginmysleep.com/tapeke-bitcoin-accounting-for-non-accountants/, Jan. 21, 2015, 1 page.

Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.

Pornin, "Deterministic Usage of the Digital Signature Algorithm (DSA) and Elliptic Curve Digital Signature Algorithm (ECDSA)," Request for Comments: 6979, Independent Submission, Aug. 2013, 79 pages.

Pour, "Bitcoin multisig the hard way: Understanding raw P2SH multisig transactions," Dec. 20, 2014, https://www.soroushjp.com/2014/12/20/bitcoin-multisig-the-hard-way-understanding-raw-multisignature-bitcoin-transactions/, 19 pages.

Ramaswami, U., et al., "Genotype and Phenotype in Hypochondroplasia", 1998, Mosby, Inc., 5 pages.

Abeikverdi et al., "Generating interactive, secure multiple ECC key pairs deterministically," StackExchange, http://crypto.stackexchange.com/questions/25191/generating-interactivesecure-multiple-ecc-key-pairs-deterministically, Apr. 23, 2015 [retrieved Dec. 26, 2016], 2 pages.

Akutsu et al., "Taking on the challenge of creating epoch-making services that impress users. For services that can share the excitement of competitions around the world," NTT Technical Journal 27(5):10-14, May 1, 2015.

Allison, "Symbiont's Adam Krellenstein: There's really only two smart contract systems—Ethereum's and ours," International Business Times, https://www.ibtimes.co.uk/symbionts-adam-krellenstein-theres-really-only-two-smart-contract-systems-ethereums-ours-1530490, Nov. 25, 2015 [retrieved Dec. 12, 2018], 4 pages.

Alonso et al., "Digital Economy Outlook," BBVA Research, Oct. 2015, https://www.bbvaresearch.com/wpcontent/uploads/2015/10/Digital_Economy_Outlook_Oct15_Cap1.pdf, 16 pages.

Andersen, "Blockchain Technology: A game-changer in accounting?," Deloitte & Touche GmbH Wirtschaftsprüfungsgesellschaft, Mar. 2016, 5 pages.

Andresen et al., "Relay OP_Return data TxOut as standard transaction type. #2738," Github, Jun. 4, 2013, https://github.com/bitcoin/bitcoin/pull/2738, 12 pages.

Anonymous, "Bitcoin Core 0.11 (ch 2): Data Storage—Bitcoin Wiki," retrieved from https://en.bitcoin.it/w/index.php?title=Bitcoin_core-0.11_(ch_2):_Data_Storage, Jan. 16, 2016, 10 pages.

Anonymous, "Bitcoin Developer Guide," Bitcoin Project, https://web.archive.org/web/20160515171209/https://bitcoin.org/en/developer-guide, May 15, 2016 [retrieved Mar. 13, 2019], 55 pages.

Anonymous, "Bitcoin Stats," retrieved from http://bitcoinstats.com/irc/bitcoin-dev/logs/2015/03/27, Mar. 27, 2015, 11 pages.

Anonymous, "Bitsquare—The decentralised bitcoin exchange," Bitsquare.io, Jan. 3, 2016 , 14 pages.

Anonymous, "Homepage," website operational as of 2017 [retrieved Nov. 30, 2020], https://www.coinffeine.com/, 2 pages.

Antonopoulos et al., "Bitcoin Book," GitHub, retrieved from https://github.com/bitcoinbook/bitcoinbook, Jun. 8, 2017, 4 pages.

Antonopoulos, "Mastering Bitcoin—Unlocking Digital Cryptocurrencies," O'Reilly Media, Inc., Dec. 20, 2014, 282 pages.

Antonopoulos, "Mastering Bitcoin, Chapter 4, Keys, Addresses, Wallets", O'Reilly, Dec. 20, 2014, 34 pages.

Atsushi Takeda et al., "System Architecture for Decentralized Authentication in P2P Network", IPSJ SIG technical Reports, Information Processing Society of Japan, Jun. 12, 2008, vol. 2008 No. 54, [ISSN] 0919-6072, pp. 63-68.

Australian Office Action for Application No. 2017223158, mailed Jun. 22, 2021, 7 pages.

Bitcoin Forum, "Counterparty—Pioneering Peer-to-Peer Finance", https://bitcointalk.org/index.php?topic=395761.0, Feb. 1, 2014, 7 pages.

bitcoininvestor.com, "All-Star Panel: Ed Moy, Joseph VaughnPerling, Trace Mayer, Nick Szabo, Dr. Craig Wright," YouTube, https://youtu.be/LdvQTwjVmrE, Bitcoin Investor Conference, Oct. 29, 2015 [retrieved Dec. 12, 2018], 1 page.

Bitfreak! et al, "Understanding Stealth Addresses/Payments," Bitcoin Forum, Jun. 10, 2015 (retrieved Jun. 16, 2020), https://bitcointalk.org/index.php?topic=1086498.0, 8 pages.

Bitfury Group, "Public Versus Private Blockchains", Part 2: Permissionless Blackchains, in collaboration with Jeff Garzik, Version 1.0, Oct. 20, 2015, 20 pages.

Bitfury Group, "Smart Contracts on Bitcoin Blockchain," BitFury Group Limited, Aug. 13, 2015 (updated Sep. 4, 2015), http://bitfury.com/content/5-white-papers-research/contracts-1.1.1.pdf, 20 pages.

Block_Chan, "Tweet dated Nov. 7, 2018," Twitter, Nov. 7, 2018, https://twitter.com/block_chan/status/1060336404163584000, 1 page.

Bluematt, "Contract", Bitcoin Wiki, Oct. 22, 2015, 12 pages.

Bradbury, "Developers Battle Over Bitcoin Block Chain," Coindesk, http://www.coindesk.com/developers-battle-bitcoin-block-chain/, Mar. 25, 2014, 3 pages.

Brown et al., "Standards for Efficient Cryptography 1: Elliptic Curve Cryptography Version 2.0," Certicom Research, May 21, 2009, 144 pages.

Brown et al., "Standards for Efficient Cryptography 2: Recommended Elliptic Curve Domain Parameters Version 2.0," Certicom Research, Jan. 27, 2010, 37 pages.

Brown, "On Distributed Satabases and Distributed Ledgers", Thoughts on the Future of Finance, Nov. 8, 2016, https://gendal.me/page/3/, 44 pages.

Burgess et al., "The Promise of Bitcoin and the Blockchain," Consumers' Research, Jul. 13, 2015, 97 pages.

Buterin et al., "Ethereum Development Tutorial," GitHub, Jul. 1, 2014 [retrieved Jul. 20, 2021], https://github.com/ethereum/wiki/wiki/ethereum-development-tutorial/0c1f501ea03a787910049b03723f1bfd7a14c9c6, 13 pages.

Buterin, "Bitcoin Multisig Wallet: The Future Of Bitcoin," Bitcoin Magazine, Mar. 13, 2014 [retrieved May 12, 2020], https://bitcoinmagazine.com/articles/multisig-future-bitcoin-1394686504, 7 pages.

Buterin, "Introducing Ethereum Script 2.0", Ethereum Foundation Blog, Feb. 3, 2014, 9 pages.

Buterin, "Secret Sharing DAOs: The Other Crypto 2.0," Ethereum Blog, Dec. 26, 2014 [retrieved Nov. 21, 2019], https://ethereum.github.io/blog/2014/12/26/secret-sharing-daos-crypto-2-0/, 10 pages.

Campagna et al., "Standards for Efficient Cryptography 4: Elliptic Curve Qu-Vanstone Implicit Certificate Scheme (ECQV) Version 1.0," Certicom Research, Jan. 24, 2013, 32 pages.

Charlon et al., "Open-Assests-Protocol," Github.com, Nov. 17, 2015 [retrieved Jan. 30, 2017], https://github.com/OpenAssets/open-assets-protocol/blob/master/specification.mediawiki, 5 pages.

Christidis et al., "Blockchains and Smart Contracts for the Internet of Things," IEEE Access 4(1):2292-2303, May 10, 2016.

Coinprism, "80 bytes OP_Return explained," Coinprism Blog, http://blog.coinprism.com/2015/02/11/80-bytes-op-return/, Feb. 11, 2015 [retrieved Dec. 21, 2018], 8 pages.

Corallo, "[Bitcoin-development] Relative Checklocktimeverify (was CLTV proposal)," Linux Foundation, https://lists.linuxfoundation.org/pipermail/bitcoin-dev/2015-May/007858.html, May 4, 2015 [retrieved Dec. 12, 2018], 3 pages.

Counterparty, "Home Page," Counterparty, copyright 2018 [retrieved Jan. 13, 2020], counterparty.io, 3 pages.

(56)                References Cited

OTHER PUBLICATIONS

Countyparty, "The Counterparty Protocol," retrieved from https://github.com/jsimnz/Counterparty/blob/master/README.md, Jan. 8, 2014, 6 pages.
crpit.com, FYJC Mumbai 11th Online Admission 2021—Part—1, 2 Admission Form (mumbai.11thadmission.Org.in), https://crpit.com, Jul. 6, 2021 8 pages.
Danda et al., "hd-wallet-addrs," GitHub, https://github.com/dan-da/hd-wallet-addrs, Dec. 30, 2015 [retrieved Mar. 11, 2016], 7 pages.
Danda et al., "Is there any service/api for deriving HD wallet addresses from a master public key?," StackExchange, http://bitcoin.stackexchange.com/questions/38887/is-there-any-service-api-for-deriving-hdwallet-addresses-from-a-master-public-k, Jul. 30, 2015, 2 pages.
Danda, "Help / FAQ," MyBitPrices, https://mybitprices.info/hd-wallet-addrs.html, Jan. 1, 2016 [retrieved Mar. 11, 2016], 4 pages.
Das, "As Exchanges Pause Withdrawals, Chinese Bitcoin Investors Switch to P2P Trading," CCN, Feb. 13, 2017 [retrieved May 12, 2020], https://www.ccn.com/chinese-bitcoin-investors-switch-p2p-trading-exchanges-pause-withdrawals/, 4 pages.
Dash et al., "bips/bip-0047.mediawiki," Github, Feb. 24, 2016 (retrieved Jun. 16, 2020), https://github.com/bitcoin/bips/blob/15c0b250cb5b77eba3ea709b082d7da6a310d991/bip-0047.mediawiki, 16 pages.
Decker, "[BIP] Normalized transaction IDs," Bitcoin-Dev, https://bitcoin-development.narkive.com/DjOYjEig/bip-normalized-transaction-ids, Oct. 19, 2015 [retrieved Dec. 12, 2018], 16 pages.
Deloitte, "Blockchain Technology A Game-changer in Accounting", Mar. 2016, 5 pages.
Dixon, "True peer-to-peer currency exchange?," DGC Magazine, Jul. 2, 2013 [retrieved May 12, 2020], http://dgcmagazine.com/true-peer-to-peer-currency-exchange/, 6 pages.
Dorier, "Colored Coins and Ricardian Contracts," Coinprism Blog, Dec. 10, 2014 [retrieved Jan. 30, 2017], http://blog.coinprism.com/2014/12/10/colored-coins-and-ricardian-contracts/, 9 pages.
Drcode,"New Kid on the Blockchain," Hacker News, https://news.ycombinator.com/item?id=11372455, Mar. 28, 2016 [Dec. 12, 2018], 32 pages.

* cited by examiner

300

302 — Receive invitation details from Alice

304 — Generate redeem script and send to Alice

306 — Receive signed redeem script from Alice

308 — Generate redeem script hash

310 — Publish invitation details and hash on P2P DHT

Generate locking script for invitation on P2P DL — 312

ALICE

| Offer: | BTC |
|---|---|
| Request: | Token |
| Offer-type-code | $0000_2$ |
| Offer-QTY-max | NULL |
| Offer-QTY-min | NULL |
| Offer-item-ID | |
| Rate-min | $4.00000000 \times 10^{-5}$ shares/satoshi |
| Rate-max | NULL (no maximum - i.e. infinity) |
| Request-type-code | $0001_2$ |
| Request-item-ID | CAD1234 |
| Request-QTY-max | 10000 shares |
| Request-QTY-min | NULL (no minimum - i.e. 0) |
| Offer-Deadline | midnight 31-Dec-2016 |
| Explanation of the order | I will buy tokenised CAD for BTC up to $1000 at a rate of no less than $400/BTC. Deadline is midnight 31-Dec-2016 |

FIG. 4

BOB

| Offer: | TOKEN |
|---|---|
| Request: | BTC |
| Offer-type-code | $0001_2$ |
| Offer-QTY-max | 15000 shares |
| Offer-QTY-min | NULL (no minimum - i.e. 0) |
| Offer-item-ID | CAD1234 |
| Rate-min | $2.43902439 \times 10^{2}$ satoshis/share |
| Rate-max | NULL (no maximum) |
| Request-type-code | $0000_2$ |
| Request-item-ID | |
| Request-QTY-max | NULL |
| Request-QTY-min | NULL |
| Offer-Deadline | NULL |
| Explanation of the order | I will sell tokenised CAD up to $1500 at a rate of no more than $410/BTC |

FIG. 5

| Alice sends BTC to Bob | |
|---|---|
| ALICE0040 | Trancaction-ID |
| Version number | Version number |
| 1 | Number of inputs |
| ALICE0010 | Prev Trans Output |
| IDX-00 | Prev Trans Output index |
| Script length | Script length |
| Sig-Alice Sig-EscrowA < OP_2 metadataA metadataB metadataC metadataD metadataE PubK-Alice PubK-EscrowA OP_7 OP_CHECKMULTSIG> | ScriptSig |
| Sequence number | Sequence number |
| 3 | Number of outputs |
| 248,913,580 satoshi | Output value |
| Output script length | Output script length |
| OP_DUP OP_HASH160 <PubK-Bob hash> OP_EQUALVERIFY OP_CHECKSIG | Output script |
| 2,469,136 satoshi | Output value |
| Output script length | Output script length |
| OP_DUP OP_HASH160 <PubK-Server hash> OP_EQUALVERIFY OP_CHECKSIG | Output script |
| 3,116,284 satoshi | Output value |
| Output script length | Output script length |
| OP_DUP OP_HASH160 <PubK-Alice hash> OP_EQUALVERIFY OP_CHECKSIG | Output script |
| LockTime | LockTime |
| Bob sends token to Alice | |
| BOB00030 | Trancaction-ID |
| Version number | Version number |
| 2 | Number of inputs |
| BOB00010 | Prev Trans Output |
| IDX-00 | Prev Trans Output index |
| Script length | Script length |
| Sig-Bob Sig-Issuer < 2 metadata1 metadata2 PubK-Bob PubK-Issuer 4 OP_CHECKMULTSIG> | ScriptSig |
| Sequence number | Sequence number |
| BOB00010 | Prev Trans Output |
| IDX-01 | Prev Trans Output index |
| Script length | Script length |
| Sig-Bob PubK-Bob | ScriptSig |
| Sequence number | Sequence number |
| 4 | Number of outputs |
| 10,000,000 satoshi | Output value |
| Output script length | Output script length |
| OP_HASH160 <redeem script hash>OP_EQUAL | Output script |
| 5,000,000 satoshi | Output value |
| Output script length | Output script length |
| OP_HASH160 <redeem script hash>OP_EQUAL | Output script |
| 10,000 satoshi | Output value |
| Output script length | Output script length |
| OP_DUP OP_HASH160 <PubK-Server hash> OP_EQUALVERIFY OP_CHECKSIG | Output script |
| 990,000 satoshi | Output value |
| Output script length | Output script length |
| OP_DUP OP_HASH160 <PubK-Bob hash> OP_EQUALVERIFY OP_CHECKSIG | Output script |
| LockTime | LockTime |

FIG. 7

| Alice sends BTC to Bob | |
|---|---|
| Transaction-ID | Trancaction-ID |
| Version number | Version number |
| 1 | Number of inputs |
| ALICE00010 | Prev Trans Output |
| IDX-00 | Prev Trans Output index |
| Script length | Script length |
| Sig-Alice PubK-Alice | ScriptSig |
| Sequence number | Sequence number |
| 3 | Prev Trans Output |
| 246,913,580 satoshi | Prev Trans Output index |
| Output script length | Script length |
| OP_DUP OP_HASH160 <redeem script hash> OP_EQUAL | ScriptSig |
| 2,469,136 satoshi | Sequence number |
| Output script length | Number of outputs |
| OP_DUP OP_HASH160 <PubK-Server hash> OP_EQUALVERIFY OP_CHECKSIG | Output value |
| 50,616,284 satoshi | Output script length |
| Output script length | Output script |
| OP_DUP OP_HASH160 <PubK-Alice hash> OP_EQUALVERIFY OP_CHECKSIG | Output value |
| LockTime | Output script length |

| Bob sends token to Alice | |
|---|---|
| Transaction-ID | Trancaction-ID |
| Version number | Version number |
| 2 | Number of inputs |
| BOB00010 | Prev Trans Output |
| IDX-00 | Prev Trans Output index |
| Script length | Script length |
| Sig-Bob Sig-Issuer < 2 metadata1 metadata2 PubK-Bob PubK-Issuer 4 OP_CHECKMULTSIG> | ScriptSig |
| Sequence number | Sequence number |
| BOB00010 | Prev Trans Output |
| IDX-01 | Prev Trans Output index |
| Script length | Script length |
| Sig-Bob PubK-Bob | ScriptSig |
| Sequence number | Sequence number |
| 4 | Number of outputs |
| 10,000,000 satoshi | Output value |
| Output script length | Output script length |
| OP_HASH160 <redeem script hash>OP_EQUAL | Output script |
| 5,000,000 satoshi | Output value |
| Output script length | Output script length |
| OP_HASH160 <redeem script hash>OP_EQUAL | Output script |
| 10,000 satoshi | Output value |
| Output script length | Output script length |
| OP_DUP OP_HASH160 <PubK-Server hash> OP_EQUALVERIFY OP_CHECKSIG | Output script |
| 880,000 satoshi | Output value |
| Output script length | Output script length |
| OP_DUP OP_HASH160 <PubK-Bob hash> OP_EQUALVERIFY OP_CHECKSIG | Output script |
| LockTime | LockTime |

FIG. 9

| | |
|---|---|
| AB00010 | Trancaction-ID |
| Version number | Version number |
| 3 | Number of inputs |
| ALICE00010 | Prev Trans Output |
| IDX-00 | Prev Trans Output index |
| Script length | Script length |
| Sig-Alice PubK-Alice | ScriptSig |
| Sequence number | Sequence number |
| BOB00010 | Prev Trans Output |
| IDX-00 | Prev Trans Output index |
| Script length | Script length |
| Sig-Bob Sig-Issuer < 2 metadata1 metadata2 PubK-Bob PubK-Issuer 4 OP_CHECKMULTSIG> | ScriptSig |
| Sequence number | Sequence number |
| BOB00010 | Prev Trans Output |
| IDX-01 | Prev Trans Output index |
| Script length | Script length |
| Sig-Bob PubK-Bob | ScriptSig |
| Sequence number | Sequence number |
| 7 | Number of outputs |
| 246,913,580 satoshi | Output value |
| Output script length | Output script length |
| OP_DUP OP_HASH160 <PubK-Bob hash> OP_EQUALVERIFY OP_CHECKSIG | Output script |
| 2,468,136 satoshi | Output value |
| Output script length | Output script length |
| OP_DUP OP_HASH160 <PubK-Server hash> OP_EQUALVERIFY OP_CHECKSIG | Output script |
| 50,616,264 satoshi | Output value |
| Output script length | Output script length |
| OP_DUP OP_HASH160 <PubK-Alice hash> OP_EQUALVERIFY OP_CHECKSIG | Output script |
| 10,000,000 satoshi | Output value |
| Output script length | Output script length |
| OP_HASH160 <redeem script hash>OP_EQUAL | Output script |
| 5,000,000 satoshi | Output value |
| Output script length | Output script length |
| OP_HASH160 <redeem script hash>OP_EQUAL | Output script |
| 10,000 satoshi | Output value |
| Output script length | Output script length |
| OP_DUP OP_HASH160 <PubK-Server hash> OP_EQUALVERIFY OP_CHECKSIG | Output script |
| 880,000 satoshi | Output value |
| Output script length | Output script length |
| OP_DUP OP_HASH160 <PubK-Ali hash> OP_EQUALVERIFY OP_CHECKSIG | Output script |
| LockTime | LockTime |

FIG. 10

| Alice sends token to Carol | |
|---|---|
| ALI00010 | Transaction-ID |
| Version number | Version number |
| 2 | Number of inputs |
| ALI00010 | Prev Trans Output |
| IDX-00 | Prev Trans Output index |
| Script length | Script length |
| Sig-Ali Sig-Issuer < 2 metadata1 metadata2 PubK-Ali PubK-Issuer 4 OP_CHECKMULTSIG> | ScriptSig |
| Sequence number | Sequence number |
| ALI00010 | Prev Trans Output |
| IDX-01 | Prev Trans Output index |
| Script length | Script length |
| Sig-Ali PubK-Ali | ScriptSig |
| Sequence number | Sequence number |
| 4 | Number of outputs |
| 10,000,000 satoshi | Output value |
| Output script length | Output script length |
| OP_HASH160 <redeem script hash>OP_EQUAL | Output script |
| 5,000,000 satoshi | Output value |
| Output script length | Output script length |
| OP_HASH160 <redeem script hash>OP_EQUAL | Output script |
| 10,000 satoshi | Output value |
| Output script length | Output script length |
| OP_DUP OP_HASH160 <PubK-Server hash> OP_EQUALVERIFY OP_CHECKSIG | Output script |
| 880,000 satoshi | Output value |
| Output script length | Output script length |
| OP_DUP OP_HASH160 <PubK-Ali hash> OP_EQUALVERIFY OP_CHECKSIG | Output script |
| LockTime | LockTime |

Alice pays Carol $1000 in tokenised CAD (expecting her GBP from Bob at a rate of AUD$2/GBP)
Alice pays herself the remainder of tokenised CAD (i.e. change) = $1500-$1000
Using regular (untokenised BTC) Alice pays the Service Provider's fee (say, flat rate = 10000 sat)
Using regular (untokenised BTC) Alice pays herself change from 900,000 leaving 1000 for miner

FIG. 11A

| Bob sends token to Alice | |
|---|---|
| BOB00030 | Transaction-ID |
| Version number | Version number |
| 2 | Number of Inputs |
| BOB00010 | Prev Trans Output |
| IDX-00 | Prev Trans Output index |
| Script length | Script length |
| Sig-Bob Sig-Issuer < 2 metadata1 metadata2 PubK-Bob PubK-Issuer 4 OP_CHECKMULTSIG> | ScriptSig |
| Sequence number | Sequence number |
| BOB00010 | Prev Trans Output |
| IDX-01 | Prev Trans Output index |
| Script length | Script length |
| Sig-Bob PubK-Bob | ScriptSig |
| Sequence number | Sequence number |
| 4 | Number of outputs |
| 10,000,000 satoshi | Output value |
| Output script length | Output script length |
| OP_HASH160 <redeem script hash>OP_EQUAL | Output script |
| 5,000,000 satoshi | Output value |
| Output script length | Output script length |
| OP_HASH160 <redeem script hash>OP_EQUAL | Output script |
| 10,000 satoshi | Output value |
| Output script length | Output script length |
| OP_DUP OP_HASH160 <PubK-Server hash> OP_EQUALVERIFY OP_CHECKSIG | Output script |
| 880,000 satoshi | Output value |
| Output script length | Output script length |
| OP_DUP OP_HASH160 <PubK-Bob hash> OP_EQUALVERIFY OP_CHECKSIG | Output script |
| LockTime | LockTime |

Bob pays Alice GBP500 in tokenised GBP (expecting his AUD at a rate of $2/GBP)

Bob pays himself the remainder of tokenised GBP (i.e. change) = GBP750-GBP500

Using regular (untokenised BTC) Bob pays the Service Provider's fee (say, flat rate = 10000 sat)

Using regular (untokenised BTC) Bob pays himself change from 900,000 leaving 1000 for miner

FIG. 11B

| Carol sends token to Bob | |
|---|---|
| CAR00020 | Transaction-ID |
| Version number | Version number |
| 2 | Number of inputs |
| CAR00010 | Prev Trans Output |
| IDX-00 | Prev Trans Output index |
| Script length | Script length |
| Sig-Car Sig-Issuer < 2 metadata1 metadata2 PubK-Car PubK-Issuer 4 OP_CHECKMULTSIG> | ScriptSig |
| Sequence number | Sequence number |
| CAR00010 | Prev Trans Output |
| IDX-01 | Prev Trans Output index |
| Script length | Script length |
| Sig-Car PubK-Car | ScriptSig |
| Sequence number | Sequence number |
| 4 | Number of outputs |
| 10,000,000 satoshi | Output value |
| Output script length | Output script length |
| OP_HASH160 <redeem script hash>OP_EQUAL | Output script |
| 5,000,000 satoshi | Output value |
| Output script length | Output script length |
| OP_HASH160 <redeem script hash>OP_EQUAL | Output script |
| 10,000 satoshi | Output value |
| Output script length | Output script length |
| OP_DUP OP_HASH160 <PubK-Server hash> OP_EQUALVERIFY OP_CHECKSIG | Output script |
| 880,000 satoshi | Output value |
| Output script length | Output script length |
| OP_DUP OP_HASH160 <PubK-Ali hash> OP_EQUALVERIFY OP_CHECKSIG | Output script |
| LockTime | LockTime |

Carol pays Bob $1000 in tokenised AUD (expecting her CAD at a rate of $1CAD/AUD)

Carol pays herself the remainder of tokenised AUD (i.e. change) = $1500-$1000

Using regular (untokenised BTC) Carol pays the Service Provider's fee (say, flat rate = 10000 sat)

Using regular (untokenised BTC) Carol pays herself change from 900,000 leaving 1000 for miner

FIG. 11C

| Field | Sub-field | Value | Comments |
|---|---|---|---|
| A | ContractType | 0x0000FF01 | Indicates P2P Exchange Order |
| | ContractPointer | | IPv6 address of the actual contract file location |
| | OfferRequestCodes | | Coded value indicating Offer-type (4 bits) + Request-type (4 bits) |
| | Conditions | 00000011$_2$ | Bitfield - flags indicating the presence of extra conditions in metadata fields |
| | Rate-min | 0.025 | BTC / item |
| | Rate-max | | |
| C | Offer-QTY-max | 15 | Maximum quantity of t-shirts per sale |
| | Offer-QTY-min | 5 | Minimum quantity of t-shirts per sale |
| | Request-QTY-max | | |
| | Request-QTY-min | | |
| D | Offer-Item-ID | 01245D25A | Unique ID related to item |
| | Request-Item-ID | | |

FIG. 12

METHODS AND SYSTEMS FOR EFFICIENT TRANSFER OF ENTITIES ON A PEER-TO-PEER DISTRIBUTED LEDGER USING THE BLOCKCHAIN

CROSS REFERENCE TO RELATED APPLICATIONS

This application is a continuation of U.S. patent application Ser. No. 16/079,094, filed Aug. 22, 2018, entitled "METHODS AND SYSTEMS FOR EFFICIENT TRANSFER OF ENTITIES ON A PEER-TO-PEER DISTRIBUTED LEDGER USING THE BLOCKCHAIN," which is a 371 National Stage of International Patent Application No. PCT/IB2017/050866, filed Feb. 16, 2017, which claims priority to United Kingdom Patent Application No. 1603123.9, filed Feb. 23, 2016, United Kingdom Patent Application No. 1603125.4, filed Feb. 23, 2016, and United Kingdom Patent Application No. 1604493.5, filed Mar. 16, 2016, the disclosures of which are incorporated herein by reference in their entirety.

TECHNICAL FIELD

The present invention relates to distributed, peer-to-peer ledgers and, in particular, blockchain technologies. The invention also relates in part to tokenisation and security techniques, and secure mechanisms for transferring entities and/or ownership of entities via a blockchain. It may comprise a method of performing secure transactions between different parties over a blockchain.

BACKGROUND & INTRODUCTION TO THE TECHNICAL AREA

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction (Tx) to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, e.g., added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g., a permanent, tamper proof records of events, distributed processing etc) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token which has no discernible meaning or value. The token thus serves as an identifier that allows the real-world item to be referenced from the blockchain. Tokenisation techniques can be used in respect of many different types of contexts where security, anonymity and cross-platform compliance are important. One such application area is financial applications, although the present invention is not limited to use in relation to financial transactions.

In this document we use the term 'blockchain' to include all forms of electronic, computer-based, distributed ledgers. These include, but are not limited to consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

SUMMARY OF INVENTION

The invention is defined in the appended claims.

The present invention may provide solutions for the secure control and/or transfer or exchange of an asset via a blockchain. Herein, the term "entity" may be used interchangeably with "asset". Additionally or alternatively, the invention may enable control and/or transfer of ownership of the asset. This may be a digital or virtual asset such as a smart contract, or a real-world/physical asset. The asset may be a right such as a licence or right to use or some sort of right relating to some type of property. The invention may use tokenisation techniques to facilitate this control or transfer. The invention may enable the transfer/exchange to be performed in a secure manner, incorporating the use of cryptographic keys, while not requiring any alteration of the underlying blockchain protocol. The invention may use techniques for embedding metadata in a script associated with a blockchain transaction (Tx).

The invention provides, not least: enhanced optimisation of memory usage for electronic transfers, improved security and data integrity through the use of hashing techniques, improved security through the removal of a need for a trusted third party, and enhanced anonymity of data. It may also provide improved communication mechanisms to enable disparate or distinct parties to identify each other and/or exchange data via the novel methods and/or architectures provided by the invention. This list of advantages is not limiting or exhaustive.

The invention may require the interaction and inter-communication of various distinct and separate computer-based resources, such as one or more user devices and a distributed computer system (blockchain) which includes computing nodes arranged to execute blockchain-related software and protocols.

The invention may provide a computer implemented method for efficient transfer of entities on a peer-to-peer distributed ledger (blockchain). The method may comprise: generating a first exchange transaction, and broadcasting, over a first network, the first exchange transaction for inclusion on a P2P distributed ledger, wherein the first exchange transaction comprises: an indication of a first quantity of a cryptocurrency to be transferred; a first input provided from an output of a first invitation transaction from a first user, the first invitation transaction previously included on the P2P distributed ledger, a first script, a first user private key (V1A) associated with the first user, a first third-party private key (P1T) associated with a first third-party, and a first output indicating a transfer of a first entity from the first user to a second user; and wherein the first script comprises: a first set of metadata providing an indication of the first entity to be transferred and a first set of conditions for the transfer, a first user public key associated with the first user, the first user public key being a crypto-graphic pair with the first user private key, and a first third-party public key pair associated with the first third-party, the first third-party public key being a cryptographic pair with the first third-party private key.

Thus, the hash of the (redeem) script may be provided within, or associated with, a blockchain transaction (Tx). This may be a P2SH transaction in accordance with the Bitcoin protocol, or another functionally equivalent trans-action type in another blockchain protocol. The hash of the script may serve as a look-up key to a hash table or other storage resource. This storage resource may be a public domain repository of invitations. The storage resource may comprise the look-up key (ie the hash) and all the fields from the metadata which, in combination, define the invitation. The look-up key may be a hash of the rest of the record e.g., a hash of the concatenated metadata values. In a preferred embodiment, the metadata may comprise a pointer or other reference to the location of a contract associated with a token. The contract may be stored in a separate storage resource. The invitation (as defined by the metadata in the storage resource) may be linked to the blockchain transac-tion via the hash.

A number of advantages are provided by the invention, some of which are now described. Firstly, because informa-tion regarding the exchange is included in metadata securely embedded in a distributed ledger, the exchange can be carried out securely on a peer-to-peer basis, thereby making a trusted third party unnecessary. This in turn avoids the need for a large amount of sensitive information about both parties to the exchange to be held by any third party such as a service provider, which in turn avoids the risks associated with that third party's security being compromised. This advantage is provided while also preserving anonymity of the transactions. Since the first script is hashed, it would be impracticably difficult to change the values of the metadata without causing a change in the corresponding hash values of the script. This also enables the terms of the transaction to be verified by the parties, since they are locked on a publicly available distributed ledger, which enables the integrity of the transactions to be trusted. The advantage is also provided that the first metadata can be embedded in one or more of the places available for public keys in the first script, thereby enabling nodes not suitable for processing the metadata to simply transmit the script to a further node, as opposed to blocking its progress. This in turn improves computational efficiency of the related transactions. A fur-ther advantage is provided that control data can be incor-porated into the metadata, for example an access code for a barrier in the case of a token representing a ticket for a venue or a travel ticket or voucher. The metadata may also contain a pointed to an off-block repository of the details of the exchange, thereby enabling less memory and/or processing resources to be used in processing the related transactions. A yet further advantage is provided that the token can be divided, enabling two or more transaction outputs, each of which can relate to tokenised or untokenised electronically transferrable digital asset.

The method may further comprise: generating a second exchange transaction; and broadcasting, over the first net-work, the second exchange transaction for inclusion on a P2P distributed ledger, wherein the second exchange trans-action comprises: an indication of a second quantity of a cryptocurrency to be transferred; a second input provided from an output of a second invitation transaction from the second user, the second invitation transaction previously included on the P2P distributed ledger, a second script, a second user private key associated with the second user, a second third-party private key associated with a second third-party, and a second output indicating a transfer of a second entity from the second user to a first user; and wherein the second script comprises: a second set of meta-data providing an indication of the second entity to be transferred and a second set of conditions for the transfer, a second user public key associated with the second user, and a second third-party public key associated with the second third-party.

Additionally or alternatively, the invention may provide a computer implemented method for efficient transfer of enti-ties on a peer-to-peer distributed ledger, the method com-prising: generating a first exchange transaction; and broad-casting, over a first network, the first exchange transaction for inclusion on a P2P distributed ledger, wherein the first exchange transaction comprises: an indication of a first quantity of a cryptocurrency to be transferred; a first input provided from an output of a first invitation transaction from a first user, the first invitation transaction previously included on the P2P distributed ledger, a first script, a first user private key associated with the first user, a first third-party private key associated with a first third-party, a first output indicating a transfer of a first entity from the first user to a second user; an indication of a second quantity of a cryptocurrency to be transferred; a second input provided from an output of a second invitation transaction from the second user, the second invitation transaction previously included on the P2P distributed ledger, a second script, a second user private key associated with the second user, a second third-party private key associated with a second third-party, and a second output indicating a transfer of a second entity from the second user to a first user; wherein the first script comprises: a first set of metadata providing an indication of the first entity to be transferred and a first set of conditions for the transfer, a first user public key asso-ciated with the first user, and a first third-party public key associated with the first third-party; and wherein the second script comprises: a second set of metadata providing an indication of the second entity to be transferred and a second set of conditions for the transfer, a second user public key associated with the second user, and a second third-party public key associated with the second third-party.

Preferably, generating the first exchange transaction comprises: sending the first script to the first user for signing with the first user private key; receiving the first script from the first user signed with the first user private key; sending the first script to the first third-party for signing with the first third-party private key; and receiving the first script from the first third-party signed with the first third-party private key.

Advantageously, generating the first exchange transaction further comprises: sending the first script to the second user for signing with the second user private key; receiving the first script from the second user signed with the second user private key; sending the first script to the second third-party for signing with the second third-party private key; and receiving the first script from the second third-party signed by the second third-party private key.

Generating of the second exchange transaction may comprise sending the second script to the second user for signing with the second user private key; receiving the second script from the second user signed with the second user private key; sending the second script to the second third-party for signing with the second third-party private key; and receiving the second script from the second third-party signed by the second third-party private key.

The method may further comprise sending a prompt to one or more of the first and second users to accept an exchange before generating or broadcasting the first and/or second exchange transactions.

The method may further comprise: receiving, from the first user, a first invitation to perform an exchange, the first invitation comprising the first set of metadata; generating the first script; hashing the first script to generate a first script hash; sending, over a second network, the first script and the first script hash; and sending, over the first network, the first invitation transaction for inclusion on a peer-to-peer (P2P) distributed ledger, the first invitation transaction comprising an indication of a third quantity of a cryptocurrency to be transferred and the first script hash.

The method may further comprise: receiving, from the second user, a second invitation to perform an exchange, the second invitation comprising the second set of metadata associated with the invitation; generating the second script; hashing the second script to generate a second script hash; sending, over the second network, the second script and the second script hash; and sending, over the first network, the second invitation transaction for inclusion on a peer-to-peer (P2P) distributed ledger, the second invitation transaction comprising an indication of a fourth quantity of a cryptocurrency to be transferred and the second script hash.

The first entity may be the first quantity of cryptocurrency. Additionally or alternatively, the second entity is the second quantity of cryptocurrency.

Sending of the first script and the first script hash over the first network comprises publishing the first script and the first script hash on a distributed hash table (DHT) or, alternatively, sending the first script and the first script hash to the second user.

The sending of the second script and the second script hash over the second network comprises publishing the second script and the second script hash on a distributed hash table (DHT) or, alternatively, sending the second script and the second script hash to the first user.

In some embodiments, the P2P distributed ledger is the Bitcoin block chain.

Preferably, the first third-party is an escrow service provider. Equally, the second third-party may be an escrow service provider.

Advantageously, one or more of the first exchange transaction, the second exchange transaction, the first invitation transaction and the second invitation transaction is a pay-to-script-hash (P2SH) transaction.

The first script hash and the second script hash may be Base58 encoded.

The first entity and/or the second entity may be bitcoin, a contract, goods, or services.

The contract may be for one or more of fiat currency; title deeds; tickets; goods; services.

The first set of conditions and/or the second set of conditions may comprise one or more of the following: a) one or more range limits on one or more prices related to the exchange; b) an exchange rate; c) a deadline for fulfilment of the first invitation; d) a limitation on the geographical area for the exchange to take place.

Embodiment(s) of the invention may comprise a technique for embedding metadata in a (blockchain) transaction, comprising the steps of:

generating a blockchain transaction (Tx) having an output (TxO) related to an asset (B1); and a hash of a redeem script which comprises:

metadata comprising a token which is a representation of, or a reference to, a tokenised entity; and at least one (preferably two or more) public cryptographic keys.

The digital asset (B1) may be a quantity of cryptocurrency eg Bitcoin. The redeem script may be provided within a locking script of the transaction output TxO. The metadata may be provided in the redeem script at a location which is designated in a blockchain protocol as a location for a cryptographic key. This provides the advantage that the metadata can be transferred without the need for any alteration to the underlying blockchain protocol. Nodes operating the protocol will be agnostic to the use of the metadata in place of the cryptographic key.

The method may further include the step of submitting the transaction Tx to a blockchain. In effect, the cryptocurrency (B1) may thus be locked on the blockchain in association with the token. The quantity of cryptocurrency (B1) can only be spent (redeemed) upon provision of an unlocking script which meets the requirements of the locking script for the output TxO. In particular, a redeem script must be presented which, when hashed, matches the hash provided in the locking script of TxO. As the locking script for output TxO comprises the hash of the redeem script which in turn includes the token (in the metadata), the cryptocurrency (B1) is associated with the token. Upon presentation of the correct unlocking (redeem) script, ownership of the cryptocurrency (B1) may be transferred to the redeeming party or user e.g., it is spent.

The invention may provide a computer-implemented system arranged and configured to implement any method described above. Any feature(s) mentioned above in relation to one aspect or embodiment may be used in relation to any other embodiment or aspect. Any feature mentioned in relation to a method of the invention may apply equally to a corresponding, implementing system and vice versa.

According to an aspect of the invention, there is provided a processor or group of processors operable to perform a method as described above.

According to an aspect of the invention, there is provided a computer readable medium having stored thereon instructions which, when executed, are operable to perform a method as described above.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF THE DRAWINGS

Embodiments of the present invention will now be described, by non-limiting example only, with reference to the accompanying drawings, in which:

FIG. 4 is a table illustrating a metadata format for an invitation generated by an exchange service provider;

FIG. 5 is a table illustrating a metadata format for an invitation generated by an exchange service provider;

FIG. 7 is a transaction table for a plurality of transactions between a plurality of parties to the system of FIG. 1;

FIG. 9 is a transaction table for a plurality of transactions between a plurality of parties to the system of FIG. 1;

FIG. 10 is a transaction table for a plurality of transactions between a plurality of parties to the system of FIG. 1;

FIG. 11A is a transaction table for a transaction between two parties to the system of FIG. 1;

FIG. 11B is a transaction table for a transaction between two parties to the system of FIG. 1;

FIG. 11C is a transaction table for a transaction between two parties to the system of FIG. 1; and FIG. 12 is a table illustrating metadata associated with an invitation.

DESCRIPTION OF EMBODIMENTS

Figure 1:
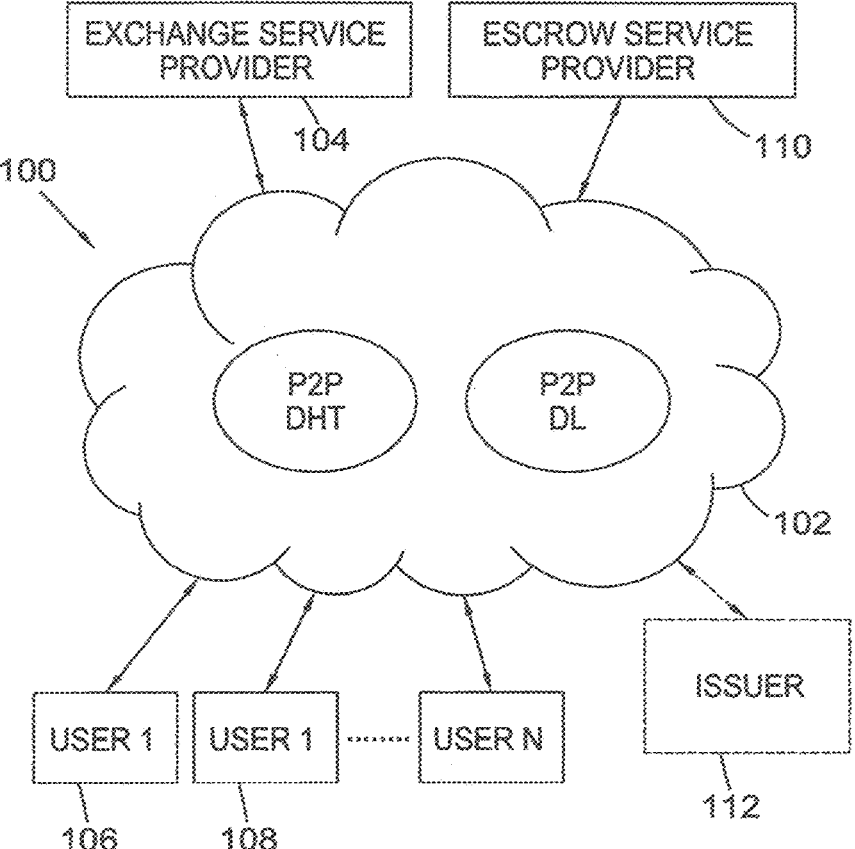
FIG. 1 is a schematic diagram of a system according to an embodiment of the present invention.

State of the art methods of performing common financial transactions, such as a payment into another person's bank account or a foreign currency exchange, incur cost in both transaction fees and time delay. In contrast, transactions in electronic currencies such as bitcoin can be processed at a much faster rate (e.g., minutes rather than days) and for far less cost (in the order of a few cents per transaction rather than tens of dollars).

There exists a need for a quicker and cheaper way of performing and keeping a permanent record of day-to-day transactions, both financial and non-financial. It is important to note, that the invention is not limited to use with, or advantages for, financial applications. Instead, the present invention generally relates to methods and apparatus for utilising a P2P distributed ledger, such as the Bitcoin blockchain, to enable parties to offer, request and exchange any type of entity of value. Methods described herein enable the entry of an invitation (or order) to perform an exchange of entities as well as the enactment the actual exchange on acceptance of an invitation. Embodiments therefore provide for a permanent record of all steps of an exchange process to be maintained. Further, each stage in the process (offer, acceptance and exchange) can be secured using cryptographic locking techniques similar to those used in transactions of cryptocurrencies.

Methods described herein can also be used to exchange any type of entity. Examples of such entities include but are not limited to bitcoins, fiat currencies, contracts, goods and services. By "cryptocurrency" is meant an encrypted, electronically transferrable digital asset such as, but not limited to, Bitcoin.

Exchanges such as Coinffeine (http://www.coinffeine-.com/) which involve the use of blockchain technologies are known in the art. However, such prior art arrangements still rely on traditional models, and also rely on third-party sources, escrows, and other multi-currency non-bank accounts/processors in order to operate. These known arrangements achieve their decentralisation through their business models, rather than through technical innovations and cryptographic techniques (as per the present invention).

The present invention incorporates the use of tokenisation techniques. Contracts may be exchanged using the system by way of tokens. A token is an exchangeable entity represented by a contract. The contract may take one of several forms. For example, the contract may confer a right upon the holder or denote ownership of property. The value of the token may be contractually specified and is linked to the underlying BTC amount via a 'pegging rate'. The token is exchangeable via a novel type of transaction using a cryptocurrency protocol such as the bitcoin protocol. The bitcoin value on the transaction acts as a token representing a rights contract in digital form. The contract itself may be stored on the blockchain or may be kept in a publicly accessible, off-block location, or may be held privately by the parties to the contract depending on the particular embodiment. Where the contract is not stored on the blockchain, the transaction may store a unique pointer, identifier or any other type of reference to the contract.

Tokens may be divisible. A divisible token is one in which the value on the transaction output can be subdivided into smaller amounts which can be allocated across multiple new tokens. Examples of divisible tokens include tokens for fiat currency or for shares in a race horse. Divisible contracts may be defined as those that specify a non-zero pegging rate. In other words, the token value is tied to the underlying bitcoin value. Alternatively, tokens may be non-divisible. A non-divisible token is a contract that specifies the holder's rights in terms of a fixed value, e.g., a contract to redeem a house or AU$1000. Non-divisible tokens are therefore not linked to the value of the underlying bitcoin. Being non-divisible, they can only be transferred as a whole.

Tokens must be digitally signed by a token issuer to be valid. The issuer may, for example be an authority such as a Registrar of Title deeds. The issuer may issue a token to a user in return for payment. That token may then give the user the right to exercise the contract linked to the token, whether the contract represents the right to redeem fiat currency or for a service to performed or for the transfer of property (e.g., a title deed).

Examples of tokens in accordance with the above, include the following:

A fiat currency token that is pegged to the BTC value of the transaction output by the issuer of the contract. For example "the spender of this token (bitcoin transaction) is entitled to redeem any fraction of this token for Canadian dollars (CAD) at a rate of 1 share (10 cents) for every 1000 satoshis".

A race horse owned by several members of a syndicate.

Any item where the ownership is by a title deed, e.g., a house or other property could be treated in this way.

An electronic contract representing a concert ticket. This is inherently non-divisible.

A bearer bond (non-divisible).

A unique identifier attached to a Goods/service (such as a bar code or RFID). If used, this identifier is still preferably validated by a signature of an authorised entity; without a signature it will fall into the less secure 'goods/service' category (described below).

A contract for the right to a service to be performed. It is noted that this is not the same as the actual service itself, but only the right to have the service performed for them. This right can be traded. For example, a voucher from Michael's Mowing for up to 3 hours lawn mowing within the Sydney metropolitan area. The holder of this voucher (contract) can redeem it for the actual service.

Tokens must specify the value of a share, e.g., 1 share=10 cents CAD, 1 share=1 rupiah, or 1 share=1% ownership of an item or property (race horse, house, etc.).

Whilst embodiments described below may refer specifically to recording transactions on the Bitcoin blockchain (or simply the blockchain), it will be appreciated that the present invention may be implemented using any P2P distributed ledger. The blockchain is used below to describe aspects of the invention for simplicity only due to its high level of standardization and large quantity of associated public documentation.

As is well known in the art, the blockchain is a transaction ledger or database which is distributed across networked nodes participating in a system based on the Bitcoin protocol. A full copy of a currency's block chain contains every transaction ever executed in the currency. Thus, a continuously growing list of transactional data records is provided. Since each transaction entered onto the block chain is cryptographically enforced, the blockchain is hardened against tampering and revision, even by operators of the data store nodes.

In embodiments of the present invention, instead of or in addition to being used in its designed function of storing a record of transactions representing payments of Bitcoins (or other cryptocurrency) from one party to another, the blockchain is used in a novel manner to enable a transfer of entities or assets between parties. The exchange transfers control and/or ownership of the digital entity from one party to another. In order to achieve this, the invention provides a mechanism for holding and recording invitations (or orders) to perform an exchange of one or more entities. The invention thus provides a novel and advantageous communication solution which is conducted via the blockchain.

As mentioned above, any type of entity or asset is exchangeable. These may be physical, "real world" entities, or virtual, digital entities. Examples of entities which may be exchanged include Bitcoins, tokens (representing any type of transferrable contract), and goods and services of any type. Tokens may represent a contract conferring specified rights upon the holder to be redeemed for fiat currency (virtual banknotes), to denote ownership of property (e.g., title deeds), or grant access to an event (tickets), to name a few of many examples. Goods and services may include new or second hand products, labour (e.g., charged by the hour), complete jobs (e.g., mowing the lawn), to name a few of many examples.

FIG. 1 is a network diagram of a P2P exchange system 100 according to one embodiment. The system 100 comprises a network 102 and a plurality of parties to the network. The parties include an exchange service provider 104, a first user 106, a second user 108, an escrow service provider 110, and an issuer 112. As will be described in more detail below, a combination of functions of the exchange service provider 104, the escrow service provider 110 and the issuer 112, may be undertaken by a single party. In other words, a single party could simultaneously perform the functions of each. In addition, and as will be explained in more detail below, the exchange service provided 104 and escrow service provider 110 are optional, since the invention can be carried out entirely on the P2P exchange system without the use of those service providers 104, 110.

The exchange service provider 104 provides exchange services to a plurality of users, including the first user 106 and the second user 108. The issuer 112 is optional to the network 102, as denoted by broken lines. As will be discussed in more detail below, the issuer 112 is required only when exchange of tokens is involved.

In some embodiments, the network 102 is the internet. Accordingly, other parties (not shown) may be party to the network 102. All parties to the network 102 are able to communicate with all other parties to the network 102. Hosted on the network 102 are a peer-to-peer distributed hash table (P2P DHT) and a peer-to-peer distributed ledger (P2P DL). It will be appreciated that some or all of the parties shown in the system 100, together with those not shown, may act as host nodes to both or either of the P2P DHT and the P2P DL.

Structure of an Invitation

An invitation may be structured include various parameters or codes. These can be used for various purposes, e.g., matching invitations as described in more detail below. In one or more embodiments, the following structure may be used:

| | |
|---|---|
| Offer-type-code | |
| Offer-QTY-max | This is the amount of value e.g., BTC that will be carried on the offeror's payment transaction. |
| | If the offeror is offering BTC than this value is simply the offeror's maximum BTC offer. |
| Offer-type-code | |
| | If the offeror is offering tokenised currency then this value is the equivalent token value of the offeror's maximum offered currency amount (calculated based on the pegging rate specified on the tokenisation contract). The same is true if the offeror is offering a tokenised other commodity such as part ownership of a racehorse (the contract will still have a pegging rate that specifies the BTC token value for shares in the horse). |

| | |
|---|---|
| | If the offeror is offering a physical item then this field is ignored - but the actual bitcoin transaction will carry the minimum required amount (i.e. dust = 546 satoshis).<br>Of course, the amount of the spend cannot exceed the total BTC value of the transaction's inputs so the offeror cannot offer more than the bitcoins owned. |
| Offer-QTY-min | |
| Offer-Item-ID | |
| Offer-Description | Keywords: This is a Condition that must be set if the Offer is goods/service and there is no other identifier (such as an auction site catalogue number) |
| Rate-min | This is the minimum rate of exchange that the offeror will accept expressed by convention as (requested units)/(offered units)<br>Examples:<br>(1) BTC offered for shares in a commodity (such as part ownership of a racehorse)<br>rate = shares/satoshis<br>(Note: this also applies to tokens that are non-divisible such as a concert ticket, although in this case there is only one share) |
| Offer-type-code | |
| | (2) Token share offered for BTC<br>rate = satoshis/share (e.g. satoshis/cent, where the tokens are for fiat amount such as CAD)<br>(3) Token for token<br>rate = requested-share/offered-share (e.g. cents/rupiah, where token offered represents rupiah and requested is CAD)<br>Note that this is only a convention for the sake of consistency and convenience and will make matching easier. The rate could be just as easily be converted into requested-satoshis/offered-satoshis based on the pegging rate used on the tokenisation contract. |
| Rate-max | |
| Conditions | This will be a code to indicate up to 8 conditions that will be coded in separate metadata fields. For example:<br>Deadline (in Unix time)<br>Location<br>The format of these metadata fields depends on the type of condition.<br>Note that Offer-Description and Request-Description are also considered conditions. They are usually not needed as all the information required normally be can be coded into the other metadata fields. If they are needed then they need to be flagged as existing by switch on the appropriate flags in the Conditions bitfield. |
| Request-type-code | |
| Request-item-ID | |
| Offer-type-code | |
| Request-description | Keywords: This is a Condition that must be set if the Request is goods/service and there is no other identifier (such as an auction site catalogue number) |
| Request-QTY-max | |
| Request-QTY-min | |

One purpose of the exchange service provider 104 is to provide a gateway for users 106, 108 to place invitations (or orders) on both the P2P DHT and the P2P DL. Whilst users 106, 108 of the network 102 may themselves place invitations on both the P2P DHT and the P2P DL, the exchange service provider 104 provides a simplified interface to improve the efficiency with which invitations are generated and to reduce the dangers associated with direct handling of transactions on a distributed ledger, such as the bitcoin ledger (e.g., losing transactions etc.) as the skilled person will appreciate. In addition to enabling the publishing of user invitations on the P2P DHT and P2P DL, the exchange service provider may perform one or more of the following additional services:

Matching invitations—As described above, an invitation may include a) details of the entities a user wishes to exchange, and b) one or more user applied options/conditions attached to the exchange. Two invitations may match when their respective entity details are mirrored and one or more of the conditions of the two invitations are compatible. In other words, a match may occur when one or more parameters or features included in a first invitation is/are also included in a second invitation. There is some commonality between the parameters in the invitations. An example of mirrored entity details would be when a first user (Alice) offers bitcoins for apples and a second user (Bob) offers apples for bitcoins. The service provider may therefore provide a matching service to match compatible invitations in order to accommodate an exchange. Matching may involve scanning the P2P DHT for one or more invitations having matching entities and/or conditions. In some embodiments, the service provider 104 may scan the P2P DHT in response to a request from a user. For example, a user may provide to the service provider 104 one or more criteria for a desired invitation. Based on the criteria provided, the service provider 104 may then search for invitations already placed on the P2P DHT which match those criteria. In other embodiments, the service provider 104 may implement a non-specific pairing algorithm which searches the P2P DHT for matching or near-matching invitations which do not relate to a specific user request. It will be appreciated that matching services may be provided by other third-party providers. One or more third-party providers may exist, whose primary purpose is to provide matching services in accordance with the above as well as match alerts as described below. In some embodiments, matching is provided by a matching service provider (MSP).

In accordance with one or more embodiments, and with reference to the table shown in the "Structure of an Invitation" section above, a matching algorithm from matching invitations between A and B such as the following may be employed:

A's Offer-type-code must match B's Request-type-code

A's Request-type-code must match B's Offer-type-code

A's Rate-Min≤B's Rate-max (when expressed in equivalent units)

A's Rate-Max≥B's Rate-min (when expressed in equivalent units)

Request-item-ID must match Offer-item-ID

A's Request-QTY-min≤B's Offer-QTY-max

A's Request-QTY-max≥B's Offer-QTY-min

A's condition(s) (if any) must be compatible with B's invitation

B's condition(s) (if any) must be compatible with A's invitation.

The invention may be arranged to incorporate machine-executable rules which enforce this algorithm or a variation thereof.

Match alerts—If a match or near-match is detected, the exchange service provider 104 may alert a user in a known manner, such as by email or via a phone or tablet app. Thus, the invention may provide a novel communication or alert mechanism.

Generating new invitations based on matches—Where a user provides details of an invitation or order he wishes to place, the service provider 104 may scan the P2P DHT for one or more invitations which satisfy the conditions of the user's order. If a matching invitation is then found on the P2P DHT, the service provider 104 may generate an invitation which mirrors the identified invitation already on the P2P DHT in order to facilitate a successful match. It is noted that in order to complete the final transaction on the P2P DL, all parties to a transaction must have an invitation already published on the P2P DL. However, not all invitations need be published on the P2P DHT. In the present example, for instance, the service provider need not publish the offer on the P2P DHT since there is no requirement for the invitation to be advertised (a desired match has already been found). It will be appreciated, however, that the generated invitation may still be placed on the P2P DHT, for example, in case the initial match falls through.

Executing transactions—After a pair of invitations have been successfully matched, the service provider 104 may act as a proxy to implement the final transaction. For example, on determination that two invitations match the service provider 104 may record an actual transaction, e.g., a transaction involving an exchange of entities, on the P2P distributed ledger. This process may be conducted automatically without the parties express authorisation or after prompting one or more of the parties to authorize the transaction. In some embodiments, metadata in an invitation may indicate whether or not a party must be notified before an exchange is finalised.

eWallet services—In addition to the above, the service provider 104 may also provide conventional eWallet services such as the holding of cryptocurrency keys, etc.

A single service provider 104 is shown in the system 100 of FIG. 1. It will, however, be appreciated that one or more additional exchange service providers may be party to the network 102. Where more than one exchange service provider exists, users may choose an exchange service provider depending on their requirements, which may include, for example, the service provider's fee structure, location, compatibility etc. It will therefore be appreciated that, in certain circumstances, two users with matching invitations may be using different exchange service providers. In such circumstances, the users' respective exchange service providers may communicate between one another in order to facilitate an exchange.

In addition to the exchange service providers 104, an escrow service provider 110 (or escrow for short) may be party to the network 104. The escrow service provider 110 enables a user's offer to be held (e.g., the amount offered is reserved) until a transaction is settled, or under certain conditions to cancel an order and have returned anything that was offered in an invitation. The escrow service provider 110 acts as a neutral third party, trusted by two parties of a transaction, to provide an escrow service for transactions. Thus, the system allows users participating in a final transaction to have a guarantee that the user making an offer can fulfil the offered amount (in bitcoins or tokens).

As with exchange service providers, more than one escrow may be party to the network 104. Users of the P2P exchange system 100 may also choose which escrow provider they use, if and when they use one. In some embodiments, the services of the escrow 110 may be incorporated into those of the exchange service provider 104 or vice versa. In such case, a separate escrow may not be required.

In addition to the above, the system 100 may also comprise an issuer 112. An issuer 112 may be involved where the transaction involves the exchange of a token. In such circumstances, the process involves the issuer signing the token. Every transaction involving the transfer of a token preferably involves the issuer 112. In embodiments described herein, the issuer's signature is required in the invitation transaction, in which the token is offered and held in escrow. The issuer's signature may also be required in the exchange transaction, in which the payment of the token is made to the counterparty.

An important aspect of embodiments of the present disclosure is the ability to embed metadata concerning an invitation to perform an exchange in a bitcoin transaction (or other cryptocurrency transaction) as well as the ability to embed metadata concerning an actual exchange, in a bitcoin or other cryptocurrency transaction. Embodiments described herein use multi-signature pay to script hash (P2SH) type transactions to enable such metadata embedding as described below.

(i) Redeem script in P2SH in general.

As background, in a standard pay-to-script-hash method of the bitcoin protocol, the redeem script may take the form of:

<NumSigs PubK1 PubK2 . . . PubK15 NumKeys OP_CHECKMULTISIG> where

NumSigs—is the number "m" of valid signatures required to satisfy the redeem script to unlock the transaction PubK1, PubK2 . . . PubK15—are the public keys that correspond to signatures that unlock the transaction (up to a maximum of 15 public keys)

NumKeys—is the number "n" of public keys (which must be 15 or less).

To redeem the above redeem script, at least a number "m" of signatures corresponding to the public keys are required. In some examples, the order of the public keys is important and the number "m" out of "n" signatures for signing must be done in sequence. For example, say that "m" is two and the number of public keys "n" is fifteen. Say that two signatures are available for use, say Sig1 (corresponding to PubK1) and Sig 15 (corresponding to PubK15), the redeem script must be signed by Sig1 first followed by Sig15.

(ii) Embedding metadata in a P2SH.

The inventors have realised that metadata may be embedded in a P2SH in one or more of the 15 places available for the public keys in the redeem script.

For example, the P2SH may take the form of:

<NumSigs Metadata1 Metadata2 . . . PubK1 PubK2 . . . NumKeys OP_CHECKMULTISIG> where

NumSigs—is the number "m" of valid signatures required to satisfy the redeem script to unlock the transaction, Metadata1 and Metadata2—each include metadata that takes the place of a public key, PubK1 and PubK2—are actual public keys, and NumKeys—is the total number of positions taken by the metadata and the public keys (which must be 15 or less).

By placing, in a redeem script, metadata corresponding to conditions of an invitation, details of a contract associated with a token, and/or other information associated with an exchange, the hash of such information will be included in the P2P distributed ledger.

This embedding method can be summarised as:

generating a blockchain transaction (Tx) having an output (TxO) related to a portion of cryptocurrency and a hash of a redeem script which comprises:

metadata comprising a token which is a representation of, or a reference to, a tokenised entity; and at least one (preferably two or more) public cryptographic keys.

The tokenised entity could be a contract and/or other entity relating to the exchange. The metadata is provided in a location designated by the protocol for a cryptographic key.

Thus, the use of multi-signature P2SH bitcoin transactions in embodiments of the present invention offers several advantages. Firstly, they enable an invitation transaction to carry a metadata payload. Secondly, they facilitate the use of escrow services in an exchange transaction. Thirdly, where tokens are transferred in an exchange, they allow an exchange transaction to carry metadata associated with the one or more tokens being exchanged. Also, the underlying blockchain protocol is agnostic to the fact that metadata is being transmitted via the transaction. Therefore, no change is required to the blockchain protocol to convey this information.

Metadata may include a description or keyword describing an offer or request in an invitation transaction. Metadata may also include conditions associated with the invitation. For example, a deadline date may be attached to the invitation which may specify a time and/or date by which the order must be fulfilled. Where a deadline condition is provided with an invitation transaction, a cancellation transaction may be generated which spends the same BTC amount and contains a locktime representing the deadline for the exchange to take place. The cancellation transaction may be prevented from being distributed on the P2P DL until the locktime. If the exchange does not take place by the deadline, the cancellation transaction is added to the P2P DL and effectively pays back the payer and or service provider. If the exchange takes place before expiry of the deadline, the exchange transaction may spend the amount, creating a double-spend that hits the P2P DL ahead of the time-locked cancellation transaction, thereby blocking the cancellation transaction. In some embodiments, the metadata may not include a deadline, but instead the cancellation transaction can be solely responsible for cancelling the original invitation transaction. Alternatively, the deadline metadata condition may not automatically cause the spending of a cancellation transaction. In other words, the deadline may be a soft deadline which remains at the payer's control. This deadline may, therefore, be extended by a party simply allowing it to lapse and still accept late matching invitations. Equally, a service provider may still attempt to match off an expired order if it remains unspent.

Instead of locking in the cancellation transaction at the same time as placing the invitation transaction, a user may wait until after the deadline and manually enter the cancellation transaction if and when he so wishes.

Conditions may also include one or more location conditions which may specify, for example, that a transaction(s) is only broadcast onto the P2P DL if the location of the transactional broadcast is within X metres of specified coordinates. This ensures that the transaction can only take place at a specified location, for example, Bob's coffee shop.

A facility may exist that enables users to create their own new conditions and add them to the list of conditions by allocating them a previously unused condition-code. This facility may be resistant to abuse. For example, each service provider simply may make public their own table of conditions along with an associated condition-code and other parties to the system 100 can choose to adopt the same coding and may also add new ones of their own. Then if disputes arise due to, for example, re-use of condition code, the disputes may be resolved by the service provider or other users of the system 100.

Some examples of implementation of the present invention will now be described by way of example transactions between the first user 106 (referred to herein as Alice) and the second user (referred to herein as Bob). In this example the transaction is an exchange of tokenised Canadian dollars for bitcoin.

Posting an Invitation

Figure 2:
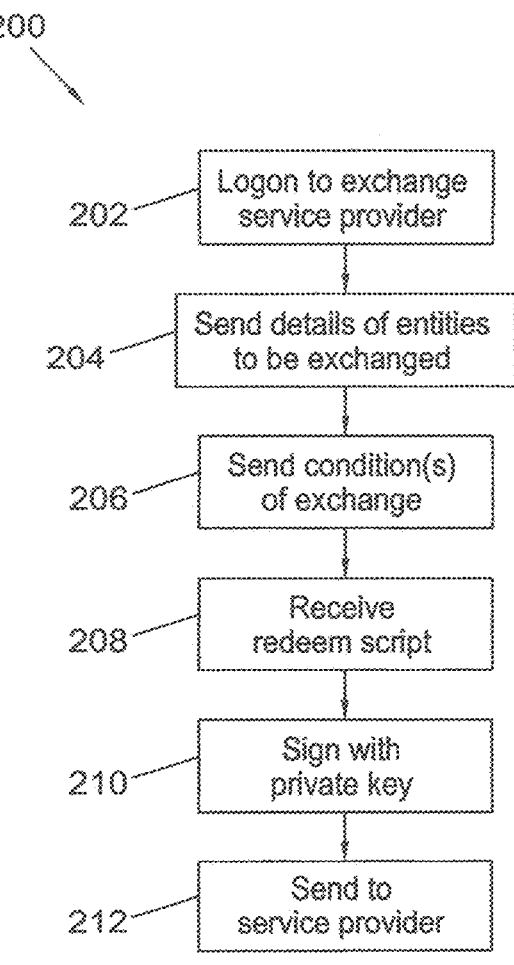
FIG. 2 is a flow diagram of a process performed by a user of the system of FIG. 1.

In a first example, Alice wants to buy some tokenised Canadian dollars (CAD) for bitcoin. To advertise her interest, Alice contacts her exchange service provider 104 through, for example, a web interface or via an app running on a tablet or cell phone. As shown in FIG. 2, at step 202, Alice logs into the service provider's 104 web interface. At steps 204 and 206, Alice then sends details of her invitation, including entities to be exchanged (tokenised CAD for bitcoin) and conditions of the exchange and any selected options offered by the service provider, to the service provider. Alice may input this information into an interface hosted by the service provider 104, for example using normal language which can then be translated by the service provider 104 into a valid invitation or, alternatively, Alice may simply enter the information by pre-selecting options, e.g., via drop-down selection menus.

At step 208, Alice receives from the service provider 104 a redeem script which has been generated by the service provider 104 based on her selections and includes information concerning the entities Alice wishes to exchange and any conditions associated with the invitation. Because Alice has signed up to use the particular service provider 104, the service provider 104 may already have Alice's public key. Alternatively, Alice may provide her public key to the service provider 104 either during the initial selection, or in response to a request from the service provider 104.

Alice signs the redeem script at step 210 using her private key, which is a cryptographic pair to her public key, and at step 212 sends the signed redeem script back to the service provider 104 to be distributed. This process may be supported with the use of an app, which may itself be provided by the service provider 104.

Figure 3:
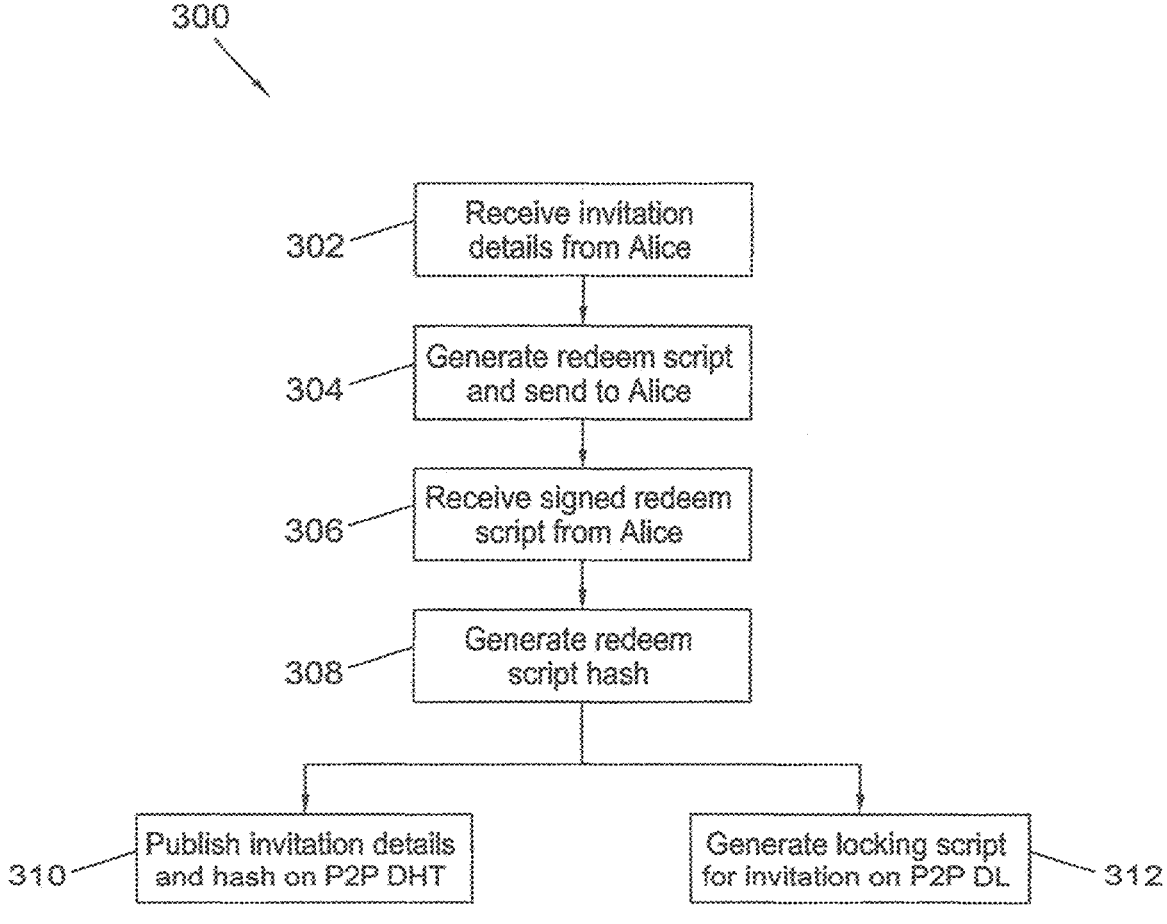
FIG. 3 is a flow diagram illustrating a process performed by an exchange service provider.

The flow diagram 300 shown in FIG. 3 illustrates the corresponding process performed by the service provider 104. At step 302, the service provider 204 receives the invitation details from Alice and generates a redeem script at step 304 using Alice's public key, the entity details and the conditions of the invitation. The redeem script may be in a format suitable for a P2SH bitcoin transaction; the invitation details may be stored in metadata fields in place of 32-byte public keys usually used in multisig unlocking scripts. FIG. 4 illustrates a format of the metadata for Alice's invitation, according to one embodiment. In the invitation, Alice requests tokenised CAD and offers bitcoins in return at a rate of no less than 400 CAD/bitcoin. As will be explained below in more detail, FIG. 4 also shows a deadline condition which may be added to the invitation. The deadline condition may cause the invitation to be revoked at the deadline in the event that an exchange has not been finalised based on the invitation.

The redeem script is then sent to Alice for signing. Upon receipt of a signed redeem script from Alice, at step 308 the service provider 104 generates a hash of the signed redeem script.

The service provider 104 uses the hash in two ways. Firstly, at step 310, the service provider 104 lists the invitation details along with the hash on the publicly available P2P DHT. As mentioned above, this table employs the torrent technique so it is distributed rather than centralised and hence it will remain publicly accessible and safe from adulteration. Other service providers 104 are then able to access the invitation and list it on their own site (indeed, the service provider 104 may simply use the hash table as the sole repository and need not even maintain its own local database of invitations.

The second way the hash is used is to create a locking script of a bitcoin transaction, at step 312. This transaction spends an amount of Alice's bitcoins to a P2SH script requiring 2 signatures to unlock: Alice's signature and that of her nominated escrow service provider 110 (which, as mentioned above, might or might not be the same entity as the service provider 104). The purpose of this transaction is twofold. Firstly, the invitation is logged on the P2P DL. Any user or their service provider can verify that the invitation on the P2P DHT is legitimate by ensuring that there exists a matching transaction on the P2P DL (via the matching hash values). Secondly, the transaction 'locks' the commitment made by Alice in her invitation; the amount of bitcoin Alice is offering in exchange for tokenised CAD is the amount spent by the order transaction. Thus, it can be verified that the order is backed by sufficient funds.

Pairing Matching Invitations

In a second example, Bob wants to sell some of his tokenised CAD for BTC and has independently listed his own invitation either using the same or a different service provider to the service provider 104 used by Alice. Bob's order, too, has been listed on the hash table and embedded in a P2P DL transaction as described with reference to FIGS. 2 and 3. The metadata of Bob's invitation is illustrated in FIG. 5.

Figure 6:
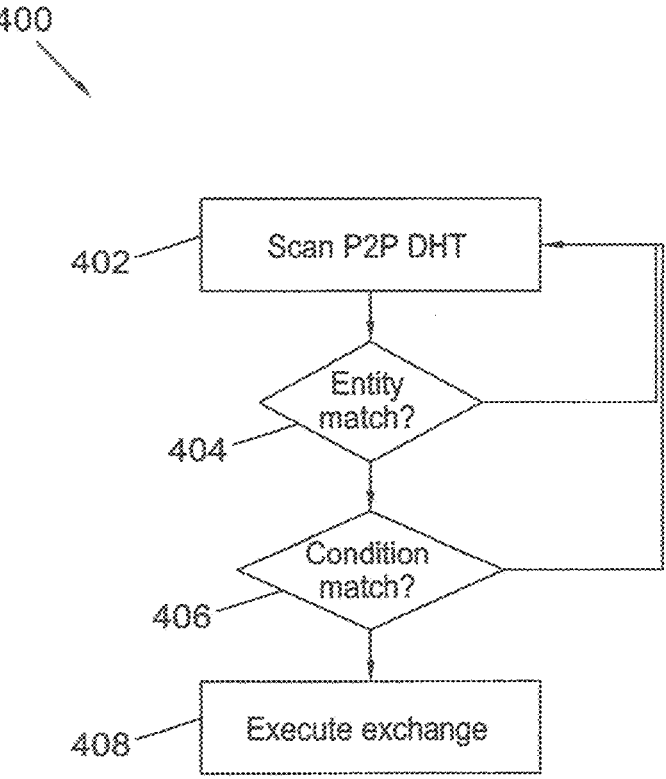
FIG. 6 is a flow diagram illustrating a process of matching invitations from two or more users of the system of FIG. 1.

Referring to FIG. 6, a process 400 of matching Alice and Bob's orders is described. In this example, the service provider 100 is described as performing the process. However, it will be appreciated that any exchange service provider or, indeed, any other suitable third-party may perform the process 400.

The exchange service provider 104 may run a matching algorithm operable to identify a full or partial match between Alice's and Bob's invitations. At step 402, the exchange service provider 104 scans the P2P DHT for matching entity details. During the scans, the service provider 104 checks for a match between the entity details of Alice's and Bob's invitations. If a match is not found at step 404, then the process returns to step 402 and the exchange service provider 104 continues to scan the P2P DHT for matching entity details. If a match is found at step 404, the process 400 continues to step 406 where a check is made for a match between one or more of the conditions of each of Alice and Bobs' invitations. If no match is found at step 406, the process returns to step 402. If a match between one or more conditions is found then the process moves to step 408 in which the exchange service provider 104 attempts to create and finalise a transaction between Alice and Bob.

A direct match of all conditions in the two invitations may not be required at step 406 for a positive match to be confirmed. Indeed, the process 400 may only require that some of the conditions match. Additionally or alternatively, one or more the conditions need not fully match. For example, if conditions being compared are exchange rates proposed in each condition, the process 400 may confirm a positive match provided the rates are within a predetermined threshold range of each other. For example, if Alice proposes a minimum rate condition of $4 \times 10^{-5}$ tokenised CAD/satoshi and Bob's equivalent maximum proposed rate is $3.9 \times 10^{-5}$ tokenised CAD/satoshi, the process may still confirm or propose a condition match even though Bob's offered rate doesn't quite satisfy Alice's original requirements. In such circumstances, upon match, Alice may be given an option to accept. It will be appreciated that if Bob's equivalent maximum proposed rate is $4.1 \times 10^{-5}$ tokenised CAD/satoshi, then the condition would be satisfied. In another example, the conditions might be respective values for goods and services proposed in an offer and request. The process 400 may again confirm a positive match provided the two values are within a predetermined threshold range of each other. In each case, the predetermined threshold range may be, for example, a discrete value or a percentage of the offer value or request value. In some embodiments, there may be a condition which can be set either to allow or disallow close matches, e.g., where there is not a direct match between Alice and Bob's respective offers. Equally, there may be a condition which can be set to either allow or disallow counteroffers which are not strictly within the offered range.

As stated previously, the transaction metadata for each or both of Bob and Alice's invitations may further comprise one or more location conditions which may specify, for example, that a transaction(s) is only broadcast onto the P2P DL if the location of the transactional broadcast is within X metres of specified coordinates. This ensures that the transaction can only take place at a specified location, for example, Bob's coffee shop.

Once a match is found, and before completing the transaction, one or more intervening steps may be performed. These may include an alert to the parties that a match has been found, followed by a request to each or both parties for confirmation that they wish to proceed, etc. For example, as discussed above, where a condition is nearly but not fully met by one or more users, a match may still be recorded but not finalised until all parties are happy with the conditions of the invitations. This process may lead to counter offers to negotiate a final agreement on conditions, which may then lead to the generation of further invitations in accordance with processes described above.

The final exchange may be executed by creating one or more bitcoin transactions that spend the outputs of each invitation transaction. The inventors have found several novel methods of completing the transaction, which may depend on circumstances including but not limited to: the users involved in the transaction, the entities being exchanged, and the service providers and issuers involved in the transactions. Some examples of these methods are described below.

Figure 8:
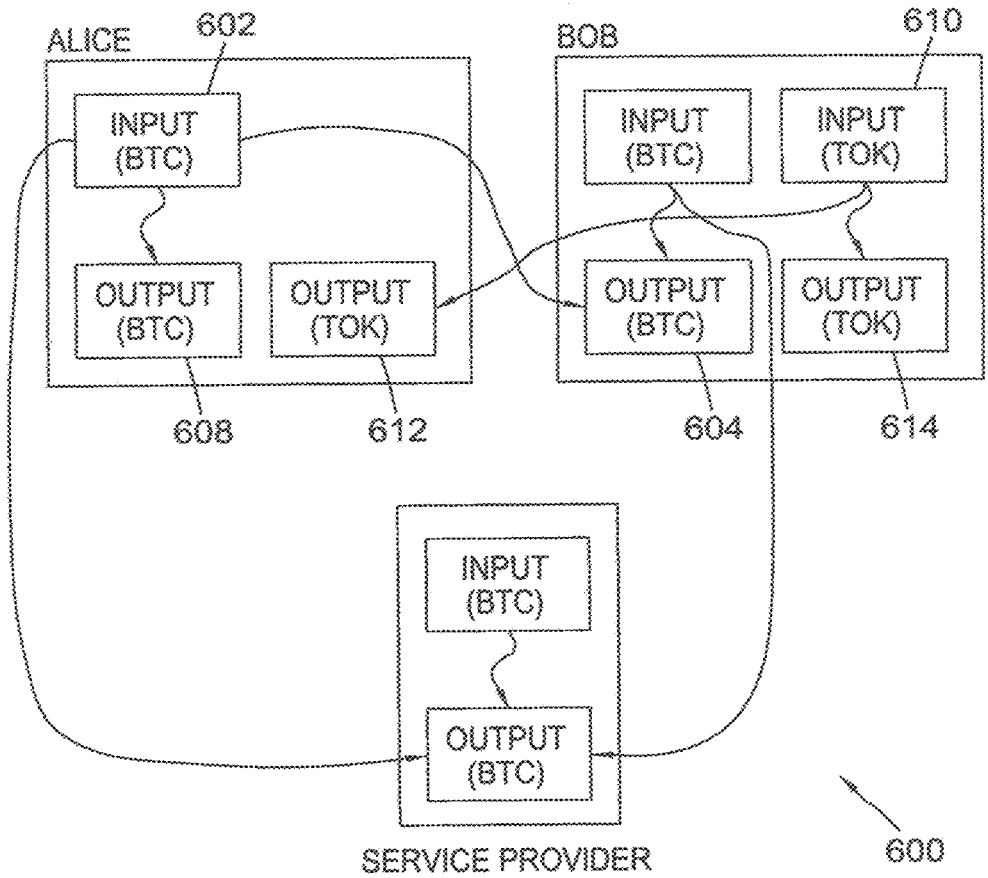
FIG. 8 is a transaction diagram illustrating transactions between parties to the system of FIG. 1.

Following on from the examples described above with reference to FIGS. 2 to 6, a transaction table 500 for the separate transactions for Alice-Bob and Bob-Alice is shown in FIG. 7 and a schematic diagram 600 of the transaction flow is shown in FIG. 8. As with the metadata values shown in FIGS. 4 and 5, values provided in the transaction table 500 are shown for example only. In this example, Alice's bitcoin in her invitation transaction are spent to Bob, and Bob's CAD-tokenised bitcoin in his invitation transaction are spent to Alice.

Referring first to the Alice-Bob transaction, the input 602 of this transaction is provided from the output of the invitation transaction which was placed on the P2P DL with Alice's invitation. Like the first transaction, the input script is signed by both Alice and the escrow service provider 110 (assuming Alice is happy for the transaction to proceed). The script unlocks the spent bitcoins which can then be output to a) Bob as his payment in return for the tokenised CAD (604), b) the exchange service provider 104 as payment for the exchange (606), and c) to Alice as change if any is due (608).

Referring now to the Bob-Alice transaction, this transaction has two inputs. The first input 610 of the transaction is provided from the output of the invitation transaction which was placed on the P2P DL with Bob's invitation. Because the input to this transaction is tokenised, the input script needs to be signed by both Bob and his token issuer. In this circumstance, the token issuer may also operate as an escrow, thereby withholding the funds until Bob (and optionally Alice) are satisfied with the transaction. The signed script unlocks the spent tokens which can then be output to a) Alice as payment in return for the BTC (612), and b) back to Bob as a change token to the value of the original token less the value sent to Alice (614). The second input 616 is from a previous bitcoin transaction of Bob's. This input is unlocked and output to a) the service provider 104 as payment for the exchange, b) the bitcoin miner as a fee for the exchange transaction and c) to Bob as change in bitcoin to the value of the original bitcoin input value less the service provider's 104 fee and the miner's fee.

The service provider's 104 fee for each transaction may be a slice of the value of the transaction. Alternatively or additionally, the fee may be a slice of the exchange rate spread between corresponding rate conditions presented in the two invitations. For example, where the offered rates overlap, the service provider 104 may fulfil both sides of the exchange at the asking rate of each and retain the difference as the fee. Alternatively or additionally, a flat fee (in satoshis, tokenised currencies or other) may be taken by the service provider 104. In some embodiments, the service provider might not extract a fee via the actual transactions. Instead, a user may be charged fees outside of the transaction. For example, a user may be charged a membership fee or a per transaction invoice for one or more transaction (per transaction or on account etc.).

Once the transaction has been completed, Bob and Alice's respective service providers may remove their invitation entries from the P2P DHT or enter a further entry which nullifies the original entry. For example, a service provider may simply leave the entry on the P2P DHT since the entry corresponds to a spend transaction, which implies that the invitation is no longer valid. Alternatively, a service provider may mark the transaction with a field that specifies that it has been spent. This may be a separate field on the DHT which corresponds to a particular entry but does not change the actual metadata associated with the invitation (this ensures that the script hash still matches the hash on the transaction). Alternatively, a service provider may delete the entry from the P2P DHT. However, a benefit of the P2P DHT is a permanent audit control for transaction using the system 100. Preferably, therefore, deletion of entries from the P2P DHT is prevented or deleted entries are archived so as to maintain a record of the entry. In one example, deleted entries are archived.

In the above example transaction, no puzzle is exchanged. In other words, the two transactions (Alice-Bob and Bob-Alice) are completely separate and discrete. It may be preferable in some cases, however, for the two transaction either to be valid or invalid. FIG. 9 shows an alternative transaction example in which a puzzle is exchanged in Alice's transaction (Alice-Bob). By doing so, the two transactions are locked together so that one cannot be spent without the other also being spent. This prevents a transaction going through from one party to another without the opposite transaction also going through.

In the above two example, two bitcoin transactions are performed to complete the exchange. Where possible, however, it is preferable to consolidate the above two transactions into a single bitcoin transaction. Doing so automatically locks together the two parts of the exchange and leads to a reduction in the overall fees paid by Alice and Bob for the transaction.

FIG. 10 shows a transaction table 700 for the single transaction between Alice and Bob. The transaction flow for the exchange is the same as that of the previous two examples, e.g., as shown in FIG. 6. However, the exchange is consolidated into a single multi-input-multi-output (MIMO) transaction. It is noted that in FIG. 8, two separate fees are paid to the exchange service provider 104. However, if the exchange service provider 104 is the same for both Bob and Alice, these two fees may be consolidated into a single transaction, paid by Bob, Alice or both Bob and Alice.

Transactions Involving More than Two Parties

Transactions described above have been in relation to exchanges between two entities. It will, however, be appreciated that in some examples more than two entities may be involved in an exchange. Consider, for example, the following scenario. Alice wishes to exchange bitcoins for apples, but will only accept a minimum of 1000 apples. Bob wants to exchange apples for bitcoins, but can only supply 500 apples. Carol wants to exchange apples for bitcoins but can only supply 600 apples. In such a circumstance, the conditions of Alice's invitation cannot be satisfied by Bob or Carol individually. Together, however, Bob and Carol have 1100 apples and so can satisfy Alice's invitation conditions.

In another example, Alice wishes to exchange tokenised CAD for tokenised GBP, Bob wishes to exchange tokenised GBP for tokenised AUD, and Carol wishes to exchange tokenised AUD for tokenised CAD. No direct match exists between any two of the three parties, but combined, each of the invitations can be satisfied—Alice's tokenised CAD can go to Carol, Bob's tokenised GBP can go to Alice, and Carol's tokenised AUD can go to Bob. FIGS. 11A to 11C show exemplary transaction tables for transaction between Alice, Bob and Carol.

Referring first to FIG. 11A, a transaction table is shown for the payment from Alice to Carol. Alice has $1500 of tokenised CAD and needs tokenised GBP500 from Bob. The transaction pays tokenised CAD1000 to Carol from Alice and Alice payers herself the remaining tokenised CAD500 (1500-1000). Using regular BTC, Alice may pay the service provider's fee (which may be a flat fee as is shown in FIG. 11A or a fee dependent on the value of the transfer) and pays herself the change minus 1000 satoshis for the miner.

Referring now to FIG. 11B, a transaction table is shown for the payment of tokenised GBP to Alice from Bob. Bob has tokenised GBP750 and needs tokenised AUD from Carol. The transaction pays tokenised GBP500 to Alice from Bob and Bob payers himself the remaining tokenised GBP250 (750-500). Using regular BTC, Bob may pay the service provider's fee (which may be a flat fee as is shown in FIG. 11B or a fee dependent on the value of the transfer) and pays himself the change minus 1000 satoshis for the miner.

Referring now to FIG. 11C, a transaction table is shown for the payment of tokenised AUD to Carol from Bob. Carol has tokenised AUD1500 and needs tokenised CAD from Alice. The transaction pays tokenised AUD1000 to Bob from Carol and Carol payers herself the remaining tokenised AUD500 (1500-1000). Using regular BTC, Carol may pay the service provider's fee (which may be a flat fee as is shown in FIG. 11C or a fee dependent on the value of the transfer) and pays herself the change minus 1000 satoshis for the minor. It will be appreciated that where an exchange is composed of two or more separate transactions (e.g., 1: Alice transfers to Bob; and 2: Bob transfers to Alice), the transactions may be linked so as to ensure that either every party receives their entitlement or none of them do. This may be achieved by satisfying the following condition (using an example of two parties, A and B, but easily extendable to three or more parties): The transaction output transferring from A to B exists and is spendable by B only if the transaction output transferring from B to A also exists and is spendable by A at the same time, and vice versa. It is note that party A and party B refer to the required set of signatories for each transaction, not just Alice and Bob (for example, it may include token Issuers, escrow, etc.).

Receiving a Selection from a User

In a variation of the example exchange described above with reference to FIG. 6, instead of a service provider parsing the P2P DHT for matching orders, users themselves may scan or browse the P2P DHT to view the current invitations. Browsing may be facilitated by a third-party, such as the exchange service provider 104. The third-party may provide an interface within which users can browse, scan and search for invitations which they might be interested in.

Users may then skip the process of entering their own prospective invitation on the P2P DHT, but instead choose to create an invitation which matches or nearly matches the order which they're interested in.

For example, carrying on from but in contrast to the previous example, Bob may find Alice's invitation on the P2P DHT via a browsing or searching interface. In which case Bob may enter his own invitation to match that of Alice's. Bob may do this in one of several ways. In one example, there may be a facility on the interface which displays Alice's order to 'Accept' her order. If Bob is a client of the same exchange service provider 104 as that which Alice used for the invitation, they may already have access to Bob's eWallet (public key etc.) and can thus create the matching order based on such information. Accordingly, the exchange service provider 110 may generate a redeem script for the matching invitation, send this to Bob for signing, receive the signed redeem script and enter the order onto the P2P DL in preparation for the transaction. If Bob is not a client of Alice's exchange service provider 104, a facility may be provided to allow Bob to enter the required information and authorisations that can then enable the Service provider to create Bob's matching order. The same process as that described above with reference to FIGS. 7 and 8 may then follow.

The above example describes the exchange of BTC for tokenised CAD. However, it will be appreciated that the system 100 works for any type of exchange including, for example, BTC for token of any type (e.g., representing any contract, not just for currency contracts), token of any type for token of any other type, BTC for goods/services, tokens for goods/services, or goods/services for goods/services. Additionally and theoretically, the above process can be modified to exchange of BTC for BTC, although such an exchange has no real meaning.

Exchanging Goods/Services

A slight variation of the above described transaction process is required when goods/services are involved in the exchange.

In such a case, the transaction (of the goods and/or services) comprises a description of the goods or services involved in the exchange. Unlike a token, which is represented by a contract or title deed, the description does not form a contract.

The description may or may not uniquely identify the item. For example, where a physical item is involved in the transaction, the description may refer explicitly to a unique identifier associated with that physical item. Additionally or alternatively, description metadata may include one or more of the following: a) a general description of a desired item offered or requested, e.g., "dishwasher, <3 yo", b) reference to a specific item for sale on an auction website, e.g., "second hand product put up for sale on an auction site", c) any number of an item type, e.g., advertise 15 t-shirts for sale that can be bought as singles or any quantity up to 15, d) reference to cash, in any specified currency, e) description of labour and payment per single job completion or for regular lawn mowing (repeating job) with payment per repetition or hour, or f) one or more keywords, e.g., "dishwasher".

As regards services, services may be backed by a contract as with a token. As such, a service may be divisible into shares, and non-divisible services may be considered as one-time jobs, e.g., divisible but comprising a single share (1 share). If the service is non-divisible, it may be treated as a token for the purposes of invitation and exchange. Where an item is backed by a token it is treated as a token for the purposes of both invitation and exchange and is exchanged in the same manner as other tokens, such as tokens for fiat currency.

An example of a transaction involving a physical item associated with a unique identifier will now be described. Similar to previous examples, in the present example, Alice has used her exchange provider to place an invitation on the P2P DL and P2P DHT. The invitation includes a description that she will buy a physical item having unique identifier XYZ123, which may relate to Rafael's masterpiece Deposition of Christ, for no more than 2500 BTC. Equally, Bob may have placed a matching invitation that he will sell item XYZ123 for no less than 2400 BTC. Alice may have browsed the P2P DL and found the item with item number XYZ123 and placed a matching order based on this information or, alternatively, Alice may have placed a generic invitation which was then matched by a third party, e.g., an exchange service provider, and subsequently a new invitation including the catalogue item number and description was made to match Bob's order.

For transactions involving unique IDs, it will be appreciated that such IDs must be unique not only to a particular exchange service provider, but also across the entire P2P DL, forever. Therefore, if the unique identifier is not totally unique to the device (e.g., the devices serial number) then the exchange service provider may generate a unique identifier for the device. To ensure that each identifier is unique to the entire P2P DL, each exchange service provider may, for example, have their own unique code prefixed to numbers they use to uniquely identify products being advertised on the P2P DL.

Once an agreement has been reached between Alice and Bob, the transactions take place in accordance with the example transactions processes described above with reference to FIGS. 7 to 10.

A further example of a transaction involving a physical item will now be described. In this example, however, the item does not have a unique identifier associated therewith.

Where an invitation includes an offer to sell a plurality of similar items, metadata may be required to describe the maximum and minimum quantity of items which can be bought with any one transaction. For example, Alice may place invitation inferring that she will sell up to 15 Dead Lizard 2015 concert tour t-shirts for 0.025 BTC each—at least 5 per transaction. In this case, metadata values may include a minimum rate (0.025BTC/items); a maximum quantity (Offer-QTY-max (15)) and a minimum quantity (Offer-QTY-min (5)). The table shown in FIG. 12 summarises the metadata associated with the invitation.

The actual BTC value on the payment transaction will then be calculated by an exchange service provider. Because this transaction simply represents an invitation to perform and exchange, the actual value of the transaction may be small, e.g., as small as dust (546 satoshis). Alternatively, as described below, the value may be a nominal amount required by a service provider to guarantee an invitation (e.g., so Alice is incentivised not to pull out).

In a further example, goods in the form of hard currency (cash) may be exchanged. For example, Alice may place an invitation to sell bitcoin for Canadian dollars (hard currency instead of tokenised) with a maximum purchase of 150 BTC. The invitation may additionally include a location condition that the exchange must take place at her shop address only: 371 Whimsy Avenue, Brentford. After placing a matching invitation, in order to finalise the transaction, Bob may then bring the cash to Alice's shop to hand over in exchange for a payment in bitcoin transaction. The actual digital transaction of bitcoin to Bob and of the digital record of transfer of hard cash to Alice, may then take place once Bob and Alice have met in her shop for the physical transfer.

In the case of a transaction involving goods/services swapped for other goods/service, it will be appreciated that the transaction on the P2P DL exists as a record only and not for exchanging any value between parties (apart from any fees to service providers etc.). Users may use the system and opt to pay the nominal service fee for entry of the transaction onto the P2P DL so that the exchange is permanently recorded.

It is noted that the original invitation transactions act as invitations only and not as value transfer or as records of events. If a goods-for-goods exchange occurs, such that the exchange involves physical items only, the final exchange need not be recorded on the P2P DL, since the P2P DL is not required to complete any transactions in the final exchange. Notwithstanding, if parties to the exchange of physical items wish to record the exchange on the P2P DL, they may each spend their invitation transactions to one another subject to a fee for the miner for doing so. If the parties do not wish to record the final exchange on the P2P DL, they may each spend their invitation transactions back to themselves, or even leave them unspent on the P2P DL.

In the case of an exchange involving BTC for goods, or tokens for goods, at least one transaction is spent on the P2P DL to transfer the value of the BTC or token. In this case, the invitation transaction offering up the goods may or may not be spent since the value of the exchange (goods) is not transferred by spending that invitation transaction. However, again, parties may decide to spend the transaction nonetheless, in order to provide a permanent record of the transfer (e.g., a receipt of sale).

The amount spent on the above transactions might not represent the offered amount in some cases, particularly when Alice's offer is not bitcoin or tokens but goods/service. Instead, the Service Provider might require a 'deposit' by Alice of an amount representing the value of the goods, or might only require a nominal amount if Alice is able to 'guarantee' the offer in another way, or (iii) might itself provide the bitcoins on Alice's behalf (she might not have any) and cover this funding cost by whatever means they charge a fee to the client.

In embodiments described above, users' invitations are published on a P2P DHT. In some embodiments, however, a user's invitation (e.g., the script and script hash) may be published on a website, sent directly to another user.

In some embodiments, a user's invitation may be stored locally by a service provider. For example, the service provider may host a private auction in which only certain users can access the user's invitation details.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The steps, features, integers, compositions and/or compounds disclosed herein or indicated in the specification of this application individually or collectively, and any and all combinations of two or more of said steps or features.

What is claimed is:

1. A computer implemented method comprising a technique for embedding metadata in a blockchain transaction, comprising the steps of:

generating a blockchain transaction (Tx) having an output (TxO) related to an asset (B1) and a hash of a redeem script which comprises:

metadata comprising a token which is a representation of, or a reference to, a tokenised entity; and at least one public cryptographic keys.

2. The method of claim 1, wherein the digital asset (B1) is a quantity of cryptocurrency, optionally wherein the cryptocurrency is Bitcoin.

3. The method of claim 1, wherein the redeem script is provided within a locking script of the transaction output TxO.

4. The method of claim 1, wherein the metadata is provided in the redeem script at a location which is designated in a blockchain protocol as a location for a cryptographic key.

5. The method of claim 1, further comprising submitting the transaction Tx to a blockchain.

6. The method of claim 5, wherein a quantity of cryptocurrency (B1) is spent upon provision of an unlocking script which meets the requirements of the redeem script for the output TxO.

7. The method of claim 1, wherein the tokenised entity is a contract and/or other entity relating to the exchange.

8. The method of claim 1, wherein the metadata is a description or keyword describing an offer or request in an invitation transaction.

9. The method of claim 8, wherein the invitation transaction further comprises a deadline condition which specifies a time and/or date by which the order must be fulfilled.

10. The method of claim 9, wherein the deadline metadata condition does not automatically cause spending of a cancellation transaction.

11. The method of claim 1, further comprising one or more location conditions which optionally specify that a transaction(s) is only broadcast onto a P2P DL if the location of the transactional broadcast is within X metres of specified coordinates.

12. The method of claim 1, further comprising a facility that enables users to create their own new conditions and add them to the list of conditions by allocating them a previously unused condition-code.

* * * * *